INVENTOR.
NELS E. SYLVANDER
BY Harry B. Keck
ATTORNEY

INVENTOR.
NELS E. SYLVANDER
BY
*Harry B. Keck*
ATTORNEY

INVENTOR.
NELS E. SYLVANDER

Dec. 25, 1962 N. E. SYLVANDER 3,070,515
FLUIDIZED LOW TEMPERATURE CARBONIZATION
OF CAKING BITUMINOUS COAL
Filed May 6, 1957 9 Sheets-Sheet 7

INVENTOR.
NELS E. SYLVANDER
BY
*Harry B. Keck*
ATTORNEY

CAKING INDICES FOR
SAMPLES TAKEN FROM
FOUR CARBONIZATION RUNS

United States Patent Office 3,070,515
Patented Dec. 25, 1962

3,070,515
FLUIDIZED LOW TEMPERATURE CARBONIZATION OF CAKING BITUMINOUS COAL
Nels E. Sylvander, Bethel Park, Pa., assignor to Consolidation Coal Company, a corporation of Pennsylvania
Filed May 6, 1957, Ser. No. 657,277
11 Claims. (Cl. 202—25)

The present invention relates to an improved process for low temperature carbonization of caking bituminous coals under fluidized solids contacting conditions. More particularly, the present invention relates to those fluidized low temperature carbonization processes which employ oxidation to prevent agglomeration of the caking bituminous coal.

I. STATE OF THE ART

A. *Fluidized low temperature carbonization.*—The field of low temperature carbonization has been a subject of intensive technical investigation in recent years. For decades fuel technologists have recognized low temperature carbonization processes as a means for obtaining substantial liquid products from bituminous coals. For the most part the early processes in the field required cumbersome apparatus and techniques for heating bituminous coal to the low temperature carbonization treatment range of about 800 to 1400° F. With the advent of the fluidized solids contacting techniques, workers in the field quickly recognized inherent benefits which would result from applying the techniques to the problem of low temperature carbonization. Cumbersome equipment and manipulative techniques could be eliminated; expensive indirect heat transfer could be eliminated; separate recovery of carbonization vapors from carbonaceous solid residue could be accomplished.

Realization of the benefits inherent in the combination has, however, been slow in arriving.

The principal obstacle in the application of fluidized solids contacting techniques to the low temperature carbonization of caking bituminous coals has been the tendency of the coal to become sticky prior to and during the evolution of tar vapors at the elevated temperatures of the process. Sticky particles of coal tend to agglomerate into large masses which result in the formation of large particles preventing continued operation.

B. *Oxidation.*—Workers in bituminous coal technology have long recognized that the stickiness exhibited by bituminous coals can be controlled through an oxidation treatment prior to thermal exposure. In fact, the caking properties of bituminous coal can be destroyed completely if the coal is subjected to sufficient oxidation. A consequence of oxidation treatment is a diminution of the tar realizable when the oxidized coal is subjected to carbonization. In order to reduce the agglomerating tendency of the coal by oxidation sufficiently to permit its treatment by fluidized low temperature carbonization, the accompanying diminution in realizable tar yield offsets the intrinsic advantages of low temperature carbonization, i.e., direct production of substantial quantities of liquid products.

C. *Recent developments.*—A solution to the problems besetting the art was developed recently by workers who discovered that the required reduction of caking properties could be effected by conducting the oxidation treatment at temperatures in the so-called plastic range of the coal. This solution was a major departure from the recommendations of prior workers who held a general belief that greater quantities of oxidation would be required at temperatures above sub-plastic temperatures. This recent development has shown that the minimum quantity of oxidation required to achieve operability of a fluidized low temperature carbonization process for caking bituminous coals occurs when the oxidation is carried out in the plastic range of the coal. See my copending U.S. patent application S.N. 427,588, filed May 4, 1954, entitled "Low Temperature Carbonization of Caking Bituminous Coals." The diminution in realizable tar yield resulting from oxidation requisite for operability can be minimized where the oxidation is carried out in the plastic temperature range.

II. CAKING BITUMINOUS COAL—THE PLASTIC RANGE

A brief discussion of caking bituminous coal and the plastic range phenomena will be helpful for a further understanding of this invention. The term "plastic range," used frequently throughout the specification, should be defined.

Caking bituminous coals just prior to carbonization undergo a visible change that can best be described as a melting phenomenon. This behavior can be observed readily by heating a coal particle in an inert atmosphere up to a temperature of approximately 800° F. At 700° F. or shortly thereafter, the cleavage edges of the coal become less defined and the particle behaves similarly to a pitch particle heated to its melting temperature, i.e., to all appearances it becomes fluid. Coincident with the appearance of the liquid phase or shortly thereafter, frothing of the liquid occurs, indicating decomposition and the rapid loss of volatile material. In a short time, frothing ceases and the material returns to a solid char phase. This behavior characterizes and defines the plastic range. For most, if not all, caking bituminous coals, the temperature limits of the plastic range are about 700 to 800° F.

III. THE HEAT SUPPLY PROBLEM

In a process as described in the afore-mentioned application S.N. 427,588, fluidizable size caking bituminous coal is preheated to an elevated temperature which is below the plastic range of the coal, thereafter subjected to oxidation in a fluidized state at a temperature within the plastic range of the coal and thereafter carbonized in a fluidized state at a temperature above the plastic range of the coal. Thus there are three separate and distinct heating burdens presented by the process.

First the coal must be preheated to an elevated temperature which is below the plastic range of the coal, e.g., 300 to 550° F. and be available at the selected preheat temperature for introduction into the preoxidizer vessel. Preferably the coal will have been thermally dried previously and will be available in a substantially moisture-free condition at a temperature of about 220° F., i.e., the vaporization temperature of water at a very slightly elevated pressure. Heat economy can be effected by avoiding any cooling of the dried coal prior to preheating.

The second heating burden occurs in the preoxidizer vessel where the coal is heated to the desired temperature within the plastic range of the coal, i.e., 715 to 800° F. This heating burden is satisfied by the exothermic heat of the oxidation reaction occurring in the preoxidizer vessel. Note that both the coal particles and the air employed as a fluidizing and reacting gas must be heated in the preoxidizer vessel to the desired temperature. Since the amount of oxidation is desirably maintained at a minimum value to achieve the improved tar yield of the two stage carbonization process, the coal preheat must be sufficient to permit attainment of the desired preoxidizer temperature via the oxidation heat released within the preoxidizer vessel.

The third heating burden occurs in the carbonization vessel which is maintained above the plastic range of the coal at a temperature from 800 to 1400° F., preferably from 900 to 1100° F. This heat may be supplied by introducing additional air into the carbonization vessel for reaction therein with char particles, i.e., those particles in the system which have already been devolatilized. While some coal particles and some evolved gases and vapors will be consumed by this so-called "carbonizer air," the slight decrement in tar yield resulting therefrom is negligible in contrast to the convenience of supplying carbonization heat in this manner. Sufficient heat must be supplied to the carbonization vessel to raise the temperature of preoxidizer coal, evolved vapors and fluidizing gases to the desired carbonization temperature level.

Alternatively, the "carbonization air" may be introduced entirely into the preoxidizer vessel which is then operated under selected kinetic conditions whereby only that degree of oxidation required for operability will occur within the preoxidizer vessel. The oxygen (from the air) which is unreacted in the preoxidizer vessel thereupon passes into the carbonization vessel along with the preoxidized coal for complete exothermic consumption therein. In any case, we have found that the oxygen utilization occurring within the preoxidizer vessel is incomplete. The oxygen utilization within the preoxidizer vessel ranges from about 60 to 90 percent, i.e., 60 to 90 percent of the oxygen introduced (as air) into the preoxidizer vessel reacts therein. The remainder of the oxygen will, thereafter, in any case, pass into the carbonization vessel.

As a further alternative, heat for the carbonization vessel may be supplied by an external char combustion technique. Particles of char from the carbonization fluidized bed are withdrawn therefrom and heated by reaction with oxygen externally of the carbonization vessel. The char particles thus heated are returned to the carbonization vessel to mingle their sensible heat with that of the char particles in the bed.

IV. THE PREHEATING AND PREOXIDATION STAGES

Heat for the preheating stage may be supplied indirectly, or directly, or both indirectly and directly. I prefer to supply the bulk of the preheating requirements by burning a portion of the non-condensible gases produced in the process and transferring the heat released by combustion indirectly into the coal particles. This can be conveniently accomplished by maintaining the coal particles in a fluidized bed in which is embedded an indirect heat transfer means such as a tube bundle. Some additional heating and concomitant oxidation can be achieved if air is employed as the fluidizing gas in the preheating stage. Additional heat for emergency conditions within the preheating stage may be provided by recirculating a portion of hot char particles from the carbonization stage directly into the fluidized preheating stage. It may be desirable to employ an inert gas for fluidizing the preheating stage and to provide thereafter an independent additional oxidation vessel for accomplishing the additional oxidation required for operability reasons prior to introducing the coal into the preoxidation stage.

The hot effluent products from the carbonization stage, both solids and vapors, possess significant quantities of sensible heat which may be recovered to effect heat economy in the system.

Within the preoxidation vessel, the air performs at least four functions. First, the air serves as a fluidizing gas for maintaining coal particles in a dense phase fluidized suspension therein. Second, the air, by combustion, provides heat required to maintain the temperature of the preoxidation vessel within the desired plastic range. Third, the partial oxidation serves to prevent the coal particles within the preoxidation vessel from agglomerating while they are residing therein. Fourth, the oxidation of coal particles at a temperature in the plastic range serves to reduce the agglomerating tendencies which they exhibit when subjected subsequently to fluidized carbonization conditions.

The heat released from combustion in the preoxidation stage must be sufficient to elevate the temperature of incoming materials to the desired temperature within the preoxidation vessel and also sufficient to offset radiation heat losses. Thus sufficient oxidation must occur within the preoxidation vessel to raise the temperature of incoming coal and of the air itself to the desired preoxidation temperature, i.e., within the plastic range of the coal.

The amount of oxidation required to maintain fluidized operability within the preoxidation vessel itself will increase according to the specific temperature at which preoxidation treatment is conducted. At temperatures below the plastic range of the coal, virtually no oxidation would be required to maintain fluidized operability in the preoxidation vessel. At temperatures above the plastic range of the coal, exorbitant amounts of oxidation would be required to maintain fluidized operability within the preoxidation vessel itself. At temperatures within the plastic range of the coal, fluidized operability within the preoxidation vessel can be achieved with a reasonable amount of oxidation therein.

An amount of oxidation is required in the preoxidation treatment to reduce the agglomerating tendencies of the coal particles when subjected subsequently to fluidized carbonization conditions. This amount will vary according to the specific temperature at which the preoxidation treatment is conducted. Where the coal is preoxidized at treatment temperatures below the plastic range of the coal, exorbitant amounts of oxidation would be required to reduce the agglomerating tendencies of the coal particles sufficiently to permit subsequent treatment of fluidized carbonization conditions. Where, however, the coal can be maintained under fluidized conditions in preoxidation vessel at temperatures above the plastic range of the coal, no additional oxidation would be required to reduce the agglomerating tendency of the coal particles for subsequent fluidized carbonization. In other words, if the coal can be maintained under fluidized conditions in a preoxidation vessel at temperatures above about 800° F., it would be sufficiently decaked thereby to be operable in a subsequent fluidized stage.

The two preoxidation treatment functions relating to operability can be separated in theory but not in actual practice. Consumption of oxygen in the preoxidation treatment fulfills both operability functions concurrently. The minimum amount of oxidation required is determined by that operability function which is controlling (i.e., demands the most oxidation) at the particular processing conditions. Factors affecting this minimum oxidation level include the nature of the particular coal undergoing treatment, the history of the coal (e.g., is it fresh or has it been in storage), the specific oxidation treatment temperature, the residence time of the coal within the preoxidation vessel, the particle size distribution of the coal, the sweep gas rate within the preoxidation vessel, the carbonization stage temperature, etc.

The principal disadvantage resulting from the use of oxidation as a means for achieving fluidized operability (i.e., avoidance of agglomerate formation) is the attendant loss of potentially realizable tar from the coal undergoing treatment. Agglomerative bituminous coals, when subjected to laboratory assay, indicate that the potentially realizable tar is as much as 40 to 50 gallons per ton of coal. The actually realizable tar resulting from an operable fluidized carbonization process employing oxidation is only about 20 to 35 gallons per ton of coal undergoing treatment. Much of the discrepancy in the tar yield is relatable to the oxidation required for achieving operability of the process. While the relationship between decreased tar yield and level of oxidation is not simple, we can, nevertheless, state that each increment of oxidation results in a decrease of realizable tar yield.

Thus, in order to maximize tar yield, the oxidation should be kept at as low a level as possible. This can be accomplished by conducting the preoxidation treatment within the plastic range of the coal as taught in the aforementioned U.S. patent application 427,588.

The interrelation of oxygen requirements for heating and for the two operability functions permits some of the required oxidation to be carried out at lower temperatures for preheating the coal to a temperature level sufficient to balance the overall heat requirements for the system. Oxidation accomplished in this manner at lower (than plastic range) temperatures appears to have some effect on that oxidation function which accomplishes operability within the preoxidation vessel itself. While the oxidation accomplished at the lower temperatures is not adequate to achieve direct operability of the coal at a carbonization temperature, it does appear to promote operability within the preoxidation vessel. The further oxidation accomplished within the preoxidation vessel is adequate to achieve the ultimately desired operability for the coal at carbonization temperatures. Thus, by providing some oxidation at lower (than plastic range) temperatures, the absolute amount of oxidation required within the preoxidation vessel (at plastic range temperatures) may be somewhat lowered. This lower temperature oxidation serves additionally to preheat the coal for the preoxidation treatment. The air employed for the lower temperature oxidation is virtually free of the valuable coal evolution vapors and thus may be eliminated from the system without serious loss of tar product. By eliminating this quantity of air (used for preheating the coal below the plastic range) from the system, the heat requirements for subsequent processing are reduced—i.e., that quantity of partially oxygen-depleted air does not pass through the remainder of the system to constitute therein a heating problem.

The oxidation below the plastic temperature range is conveniently accomplished while the coal is undergoing preheating in a fluidized preheating stage. The use of air as a fluidizing gas serves the three-fold objective of (1) maintaining the coal particles in a fluidized state while undergoing (principally) indirect preheating; (2) oxidizing the coal particles to provide additional preheat; and (3) oxidizing the coal particles to promote operability within the subsequent preoxidation vessel. While the oxygen utilization from the air during the preheating treatment is quite low at the temperature maintained therein, nevertheless, some oxidation definitely occurs and occurs in a somewhat unexpected manner. The oxidation occurring at preheating temperatures appears to be somewhat selective for the fine particles of coal undergoing treatment. This selective oxidation of the fine particles is an unexpected advantage in the present process as will be described hereinafter. The amount of additional oxidation which can be realized during a fluidized preheating treatment increases as the temperature of the fluidized preheating treatment is increased. At preheating temperatures around 300° F., very little oxidation is realized. At temperatures around 550° F., substantial oxidation may be realized.

This additional subplastic range oxidation conveniently can be accomplished by introducing air directly into a fluidized coal preheater bed. The air thereafter is employed as a fluidizing and partial oxidizing gas within the preheating vessel. The effluent gases from the preheating vessel are discharged from the system to avoid contamination of vaporous products of the process and also to avoid an increased sensible heat requirement which their presence would impose downstream in the process. In general, we prefer that the preheating treatment be conducted at temperatures not exceeding about 550° F. and preferably not exceeding temperatures about 500° F. We have found that some evolution of coal vapors occurs even at these low temperatures. For example, at about 500° F., each ton of coal will evolve perhaps one gallon of vapor.

As another alternative, additional oxidation may be obtained in an independent additional oxidation vessel positioned between the coal preheating stage and the coal preoxidation stage. An embodiment illustrating the use of an independent additional oxidation stage is presented in FIGURE 2 which also includes, as an alternative, a preferred embodiment wherein both the preoxidation vessel and the carbonization vessel are combined into a single vessel structure.

V. OBJECTS

It is an object of this invention to provide a method for introducing preheat and sufficient oxidation to achieve operability in a two-stage fluidized low temperature carbonization system for caking bituminous coal.

It is a further object of this invention to provide a two-stage fluidized low temperature carbonization system for caking bituminous coal wherein the relatively fine coal particles and the relatively coarse coal particles are oxidized to a level sufficient to achieve operability for the system without excessive loss of realizable tar yield.

These and other objects and advantages of the present invention will become apparent from the following detailed description.

VI. THE PRESENT INVENTION

The present invention will be described in relation to the accompanying drawings in which.

Figure 1:
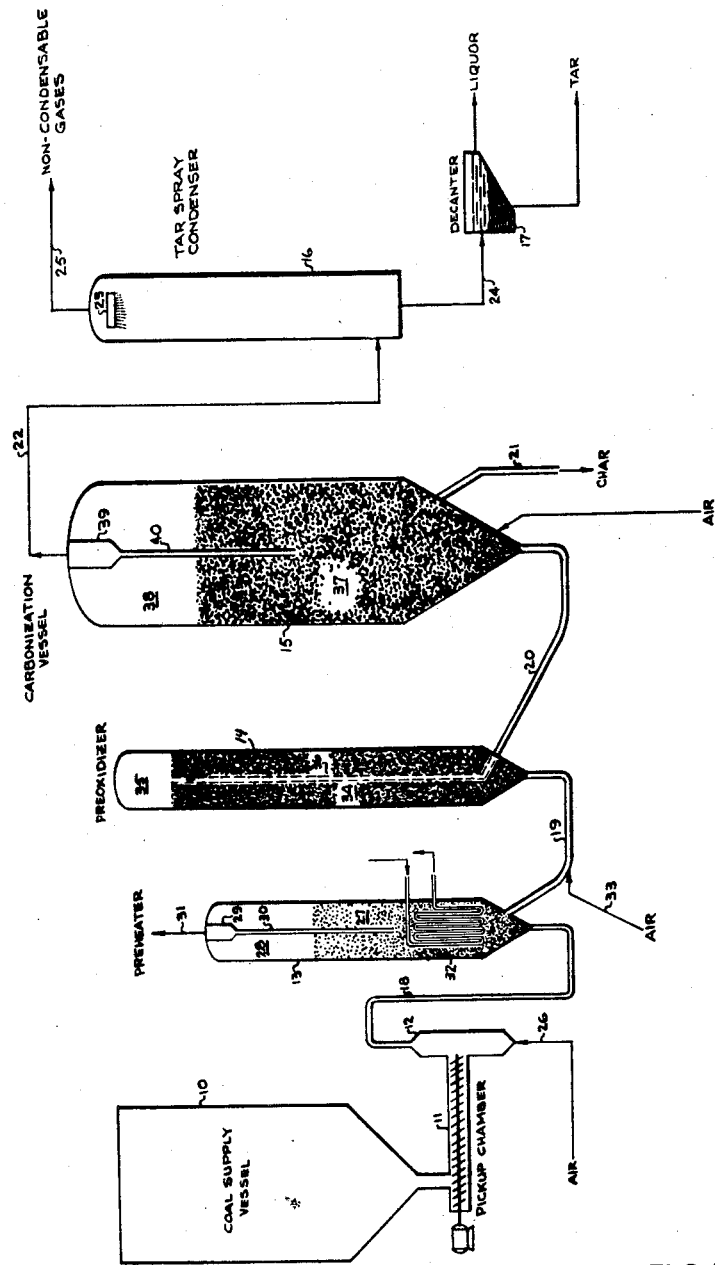
FIGURE 1 is a schematic flow diagram illustrating apparatus adapted for carrying out one embodiment of the present invention.

The principal elements illustrated in FIGURE 1 include a coal supply vessel 10, a coal feeder 11, a coal pick-up chamber 12, a preheater vessel 13, a preoxidizer vessel 14, a carbonization vessel 15, a tar spray condenser 16, and a decanter 17. Conduits are provided for conveying finely divided coal through the vessels in sequence. A conduit 18 conveys the coal from the pick-up chamber 12 to the preheater vessel 13. A conduit 19 conveys the coal from the preheater vessel 13 to the preoxidizer vessel 14. A conduit 20 conveys the coal from the preoxidizer vessel 14 into the carbonization vessel 15. A conduit 21 conveys devolatilized coal (termed "char") from the carbonization vessel 15 for recovery as solids product. A conduit 22 is provided for conveying tar vapors and non-condensible gases from the carbonization vessel 15 to the tar spray condenser 16. A water spray 23 serves to cool and condense the tar vapors which are recovered as an aqueous emulsion through a conduit 24 which transfers the emulsion to the decanter 17. Tar and liquor are separately recovered as indicated in the drawing in the decanter 17. Non-condensible gases are recovered from the tar spray condenser 16 through a conduit 25.

The feed coal employed in fluidized low temperature carbonization presents certain particle size distribution requirements. The starting coal has a nominal top size between about 35 mesh and 4 mesh Tyler Standard screen. In addition, the coal should contain a distribution of all lesser particle sizes. The coal, furthermore, should contain 15 to 35 percent by weight of particles capable of passing through a 200 mesh Tyler Standard screen. Coal crushed to pass through a 10 mesh or a 14 mesh Tyler Standard screen is preferred. These particles will hereinafter be referred to as "coal fines." We have found that the fluidization characteristics of coal are adversely affected where the coal contains less than 15 percent by weight of coal fines. "Slugging" of the fluidized beds with its attendant inefficient vapor-to-solids contact is the principal adverse result. Preferably, the quantity of coal fines is in the range of 20 to 25 percent of the coal. In addition, the feed coal should be substantially dry, i.e., free of surface moisture. The drying can be accomplished in a variety of ways. Flash heating the coal to a temperature in the range from 220 to 300° F. is a convenient continuous method for drying coal.

The coal supply vessel 10 is adapted to confine a bed of fluidizable size, substantially dry coal particles, which are employed in the process. If desired, aeration gases may be introduced into the bottom of the coal supply vessel 10 to promote a smooth flow of coal particles into the coal conveying apparatus 11.

The fluidizable size coal in a substantially dry condition is transferred through the coal conveyor 11 into the pick-up chamber 12. Air from a conduit 26 is introduced into the bottom of the pick-up chamber 12 to entrain the fluidizable size coal and to convey the coal as a suspension through the conduit 18 into the bottom of the preheater vessel 13.

The preheater vessel 13 is adapted to confine a bed 27 of finely divided coal particles under fluidized conditions. The air which is introduced through the conduit 26 serves as a fluidizing gas within the preheater vessel 13. A vapor space 28 is maintained above the dense phase fluidized bed 27 to serve as a solids disengaging zone. A vapor-solids separating device 29 is provided in the vapor space 28 of the preheating vessel 13. As shown in FIGURE 1, the vapor solids separating device 29 is a cyclone separator having a dipleg 30 extending into the dense phase fluidized bed 27. A conduit 31 is provided for removing fluidizing gas, substantially free of entrained coal particles, from the preheater vessel 13. Embedded within the dense phase fluidized bed 27 is a heat exchange apparatus 32 which may take the form of serpentine coils of heat exchange tubes as shown in FIGURE 1. A heat transfer liquid is continuously circulated through the heat exchange device 32 at an elevated temperature which should not exceed about 800° F. The thermal energy released from the heat exchange device 32 is absorbed by the coal particles in the dense phase fluidized bed 29 to provide a portion of the heat required in the process.

Preheated fluidizable size coal particles are withdrawn from the dense phase bed 27 of the preheater vessel 13 through the conduit 19. Air is introduced into the conduit 19 through a conduit 33. The air suspends the coal particles for conveyance through the conduit 19 into the preoxidizer vessel 14.

The preoxidizer vessel 14 is adapted to confine a bed 34 of finely divided coal under fluidized conditions. A vapor space 35 is provided at the top of the preoxidizer vessel above the dense phase fluidized bed 34 to serve as a solids disengaging space. The fluidizing gas for the dense phase bed 34 is the air which was introduced through the conduit 33. A vertical overflow weir 36 extends upwardly through the dence phase fluidized bed 34 and the position of its open upper end determines the superficial level of the dense phase fluidized bed 34. The preoxidizer vessel 14 is operated at a temperature within the plastic range of the coal, normally from about 715 to about 800° F.

Exposure of coal to preoxidation treatment at temperatures in the plastic range have been shown by Struck et al. (U.S. patent application 427,588, supra) to provide an operable two-stage carbonization process with improved tar yield. A partial distillation of the coil particles occurs within the preoxidizer vessel 14 resulting in the evolution of tar vapors. These coal evolution vapors along with the fluidizing gases pass downwardly through the vertical weir pipe 36 and contain entrained particles of preoxidized coal which has been treated to become non-agglomerative under the more severe thermal conditions of the subsequent carbonization treatment. The suspension of preoxidized coal particles in gases passes through the conduit 20 and is introduced into the carbonization vessel 15.

Since the preoxidized coal particles in the preoxidizer vessel are in an incipiently agglomerative condition, it is impractical to provide for separation of evolved vapors and fluidizing gases by a cyclone separator. Instead, the entire product of the preoxidizer vessel, both solids and vapors, passes as an entrained stream into the carbonizer. Consequently solids and vapors must be collected for removal from the vapor space 38 of the carbonization vessel 15. Accordingly, the coal fines in this system experience an abbreviated residence period within the preoxidizer vessel and are not oxidized therein to the same extent as the relatively coarser coal particles. Thus the following dilemma is presented.

If oxidation occurs only in such a preoxidizer vessel with overhead removal of treated coal particles, the coal fines are less oxidized than required for maintaining operability. Inoperability results. If more drastic oxidation is provided in the preoxidizer vessel to treat the coal fines sufficiently, then the relatively coarser coal particles, by virtue of their relatively extended residence period, are over-oxidized with concomitant reduction in tar yields.

The sub-plastic range oxidation preceding the plastic range preoxidation stage provides a compensating mechanism since sub-plastic range oxidation appears to be selective for the coal fines. This unexpected advantage is complementary to the advantages of heat economy already described for the sub-plastic oxidation which have already been described.

At the temperature employed for the sub-plastic range oxidation, the coal is not incipiently agglomerative. Hence it is possible to remove the preheating gases from the coal and thereby to recover preheated coal directly from the dense phase of the preheater fluidized bed whereby the residence time of the coal fines does not differ appreciably from that of the relatively coarser particles. Such a result cannot be achieved with the incipiently agglomerative coal particles found in a plastic range preoxidizer vessel.

The carbonization vessel 15 is adapted to confine a bed 37 of finely divided coal undergoing distillation in a fluidized state. A vapor space 38 is provided within the carbonization vessel 15 above the dense phase fluidized bed 37 to serve as a solids disengaging space. A vapor solids separator 39 is provided in the vapor space 38 to remove entrained solids and return them to the dense phase bed 37 through a dipleg 40. The temperature maintained within the fluidized carbonization vessel 15 is above the plastic range of the coal and between 800 and 1400° F. The residence time of the preoxidized coal particles within the dense phase fluidized bed 37 is about 10 to 40 minutes. A char product is withdrawn from the dense phase fluidized bed 37 through a conduit 21. The fluidizing gases and tar vapors are recovered, substantially free of entrained solid particles, through a conduit 22 as previously described.

Figure 2:
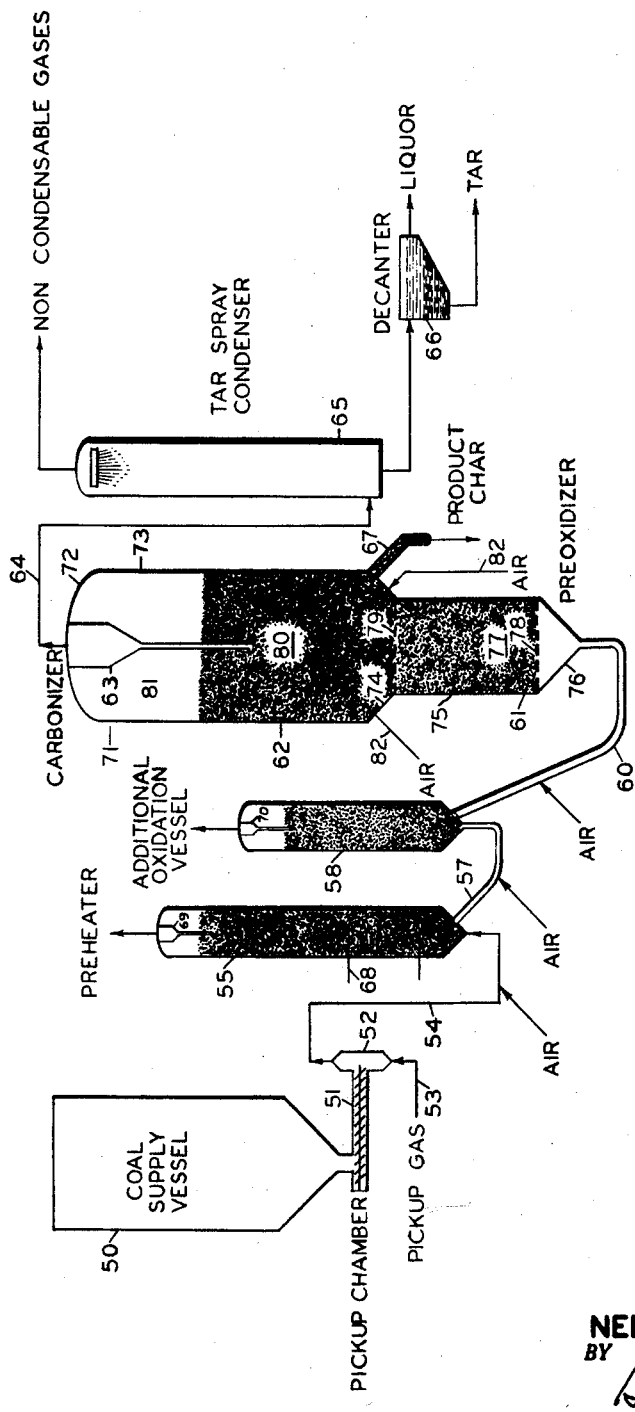
FIGURE 2 is a schematic flow diagram illustrating apparatus adapted to carry out a further embodiment of the present invention.

Referring to FIGURE 2, we have there illustrated schematically a flow diagram which includes apparatus adapted to carry out an alternative embodiment of the present invention. The principal elements of FIGURE 2 include a coal supply vessel 50, a screw conveyor 51, a pick-up chamber 52, a pick-up gas conduit 53, a transfer conduit 54, a coal preheater vessel 55, a transfer conduit 57, an additional oxidation vessel 58, a transfer conduit 60, a preoxidizer vessel 61, a carbonizer vessel 62, a cyclone separator 63, a tar recovery conduit 64, a tar spray condenser 65, a tar decanter 66, and a char recovery leg 67. Thus the elements of FIGURE 2 differ from those of FIGURE 1 in two respects: first, FIGURE 2 includes an additional oxidation vessel 58 which is not shown in FIGURE 1; second, FIGURE 2 includes a preoxidizer vessel 61 combined in an integral structure with a carbonizer vessel 62. The preoxidizer vessel 61 corresponds in function to the preoxidizer vessel 14 already described in connection with FIGURE 1.

Briefly the operation of the embodiment illustrated in FIGURE 2 will be described. Fluidizable size caking bituminous coal is introduced from a coal supply vessel 50 through a screw conveyor 51 into a pick-up chamber 52. The fluidizable size coal particles are entrained in a stream of pick-up gas from the pick-up gas conduit 53 and are transported as a suspension through transfer conduit 54 into a preheater vessel 55 maintained at a temperature of about 300 to 550° F. The pick-up gas introduced through conduit 53 is employed as the fluidizing gas to maintain the coal particles in a dense phase fluidized bed within the preheating vessel 55. Where this pick-up gas comprises air, some oxidation of the coal particles may occur within the preheater vessel 55. While oxidation effects some heat release, the coal particles nevertheless are principally heated by indirect means, such as by heat transfer coils 68 embedded within the preheater vessel 55. Preheater fluidizing gases are removed from the top of the vessel 55 after being freed of entrained coal particles by a cyclone separator 69.

Preheated coal particles are withdrawn from the dense phase fluidized coal bed of vessel 55 and are entrained in a stream of air for transportation through a transfer conduit 57 into an additional oxidation vessel 58 maintained at a temperature of about 400 to 650° F. The carrying air is employed as the fluidizing gas within the additional oxidizing vessel 58 to maintain the coal particles in a dense phase fluidized bed therein. The air also accomplishes some oxidation treatment of the coal particles and serves to maintain the desired temperature by heat release. Fluidizing air, partially depleted of oxygen, is removed from the top of the vessel 58 after being freed of entrained coal particles by a cyclone separator 70. The oxidized, preheated coal particles are withdrawn from the dense phase fluidized coal bed of the additional oxidation vessel 58 and are entrained in a stream of air for transportation through a transfer conduit 60 into a preoxidation vessel 61. Within the preoxidation vessel 61, the coal particles are maintained in a dense phase fluidized state and are subjected to oxidation within the plastic temperature range 715–800° F.

The integral vessel for preoxidation and carbonization is designated by the numeral 71. The integral vessel 71 includes a top wall 72, vertical side walls 73, inwardly sloping side walls 74, vertical side walls 75 and a bottom wall 76. The vertical side walls 75 define a relatively narrow cross-section preoxidation chamber 77 which is adapted to confine a fluidized bed of coal particles at a temperature in the plastic range of the coal in the presence of air as a fluidizing gas. The preoxidation chamber 77 is further defined by a lower generally horizontal grid 78 and an upper generally horizontal grid 79. The upper horizontal grid 79 serves to separate the preoxidation chamber 77 from a carbonization chamber 80 which is defined by the generally horizontal grid 79, the sloping side walls 74, the vertical side walls 73 and the top wall 72. The carbonization chamber 80 has a larger cross-section than does the preoxidation chamber 76. The upper portion of the carbonization chamber 80 comprises a solids disengaging zone 81 which is relatively free of the dense phase fluidized coal particles comprising the fluidizing carbonization bed.

By employing the integral vessel construction just described, certain processing advantages are achieved. The grid structure 79 restricts the area for movement of gases and solids from the preoxidation chamber 71 into the carbonization chamber 80 thus increasing the velocity of the upwardly moving gases and entrained solids. A superficial velocity of 20 to 200 feet per second is desirable for gases and solids moving through the grid structure 79. The grid structure 79 provides for a uniform distribution of oxidized coal particles entering into the carbonization chamber 80 from the preoxidation chamber 77. Back-flow of coal particles from the carbonization chamber 80 into the preoxidation chamber 79 is avoided by the unidirectional aspect of the grid structure. Moreover, the fluidizing gases which are employed in the preoxidation stage may also be employed as fluidizing gases in the carbonization stage without requiring intermediate separation or repressurizing. Heat economies are inherent in the single vessel system. There is no requirement for transporting incipiently agglomerative coal particles through conduits between the preoxidation chamber 77 and the carbonization chamber 80. (In contrast, note the transfer conduit 20 of FIGURE 1.) Any oxygen which is not completely consumed within the preoxidation chamber 77 appears as fluidizing gas within the carbonization chamber 80 where its consumption serves to provide additional heat required for carrying out the carbonization process. Additional heat may be supplied for the carbonization chamber 80 by introducing air through conduits 82 provided in the sloping side walls 74.

The sub-plastic range oxidation of the coal occurs (a) in the preheater vessel 55 or (b) in the additional oxidation vessel 58 (if provided) or (c) in both vessels 55 and 58. In some instances, it may be desirable to provide the sub-plastic range oxidation concurrently with indirect preheating; here the additional oxidation vessel 58 is not required. In general it is desirable that the indirect preheat precede the sub-plastic range oxidation. Indirect heat transfer efficiency is increased because the heat-receiving coal particles are at a lower temperature in such systems. Thereafter, the coal particles which have received their quota of indirect preheat are oxidized apart from the indirect preheating means for further temperature increase. The gases employed for this purpose are separated from the system and thus do not constitute a heat burden in the succeeding treatment stages.

The unexpected feature resulting from conducting oxidation at preheating temperatures, i.e., temperatures below the plastic range of coal undergoing treatment, is that the oxidation appears to be somewhat selective for the relatively fine coal particles undergoing treatment. While the amount of oxidation which can be realized at the generally lower preheating temperatures is limited, nevertheless the coal fines appear to achieve a greater oxidation per unit weight than do the relatively coarse particles of coal. This feature has been found to be of particular advantage when the single vessel construction is adopted for the preheater vessel and the carbonization vessel as illustrated by the integral vessel 71 of FIGURE 2.

As coal is introduced into the preoxidation vessel 61 under the influence of upwardly moving fluidizing gases, there is tendency for the coal fines to be selectively swept through the preoxidation chamber 77 directly into the carbonization chamber 80 through the grid structure 79. Thus the average residence time of the coal fines within the preoxidation chamber 77 is significantly less than the average residence time of the coarser coal particles therein. Accordingly, without additional oxidation, the single vessel system magnifies the dilemma already described in connection with FIGURE 1. By providing sufficient oxidation conditions for the relatively coarse coal particles within the preoxidation chamber 77, the coal fines have a tendency to pass upwardly into the carbonization chamber 80 without sufficient oxidation and may cause agglomerate formation therein or may cause agglomerate formation and plugging of the grid structure 79 separating the two chambers. On the other hand by increasing the oxidation conditions to guarantee that the coal fines are sufficiently oxidized within the preoxidation chamber 77, the relatively coarse coal particles will be over-oxidized and thereby a needless loss of tar yield will result.

The use of air for additional oxidation preceding the preoxidation treatment presents a solution to this dilemma. Somewhat unexpectedly, as already pointed out, the coal fines appear to be selectively oxidized under the lower preheating temperature conditions. Thus when additional oxidation is provided prior to the preoxidation vessel 61 as described, the coal fines enter into the preoxidation vessel 61 in a more highly oxidized state than the relatively coarser coal particles. Thus the abbreviated residence time of the coal fines within the preoxidation chamber 77 will provide sufficient additional oxidation to achieve operability for the coal fines. Similarly, the coarser coal particles entering into the preoxidation vessel 61 can withstand a lengthened residence time within the preoxidation chamber 77 sufficient to achieve a condition of operability without becoming over-oxidized.

It is important that the coal recovered from fluidized sub-plastic range oxidation stages be withdrawn directly from the dense phase fluidized beds instead of in the form of an overhead accumulation of coal particles. At sub-plastic temperatures, the coal particles do not exhibit sticky tendencies and can be collected in cyclone separators for returning to the dense phase fluidized processing beds. By collecting the coal particles for further treatment from the dense phase fluidized beds, the described abbreviated residence time of the coal fines is avoided in the sub-plastic range oxidation treatment.

Thus the embodiment, schematically illustrated in FIGURE 2, provides a useful means for accomplishing fluidized low temperature carbonization of caking bituminous coal employing preoxidation in the plastic range thereof to achieve operability concomitant with economically feasible yields of tar from the process. To further illustrate my preferred embodiment I have provided a detailed description of a specific embodiment thereof as shown in FIGURES 3 through 8.

Figure 3:
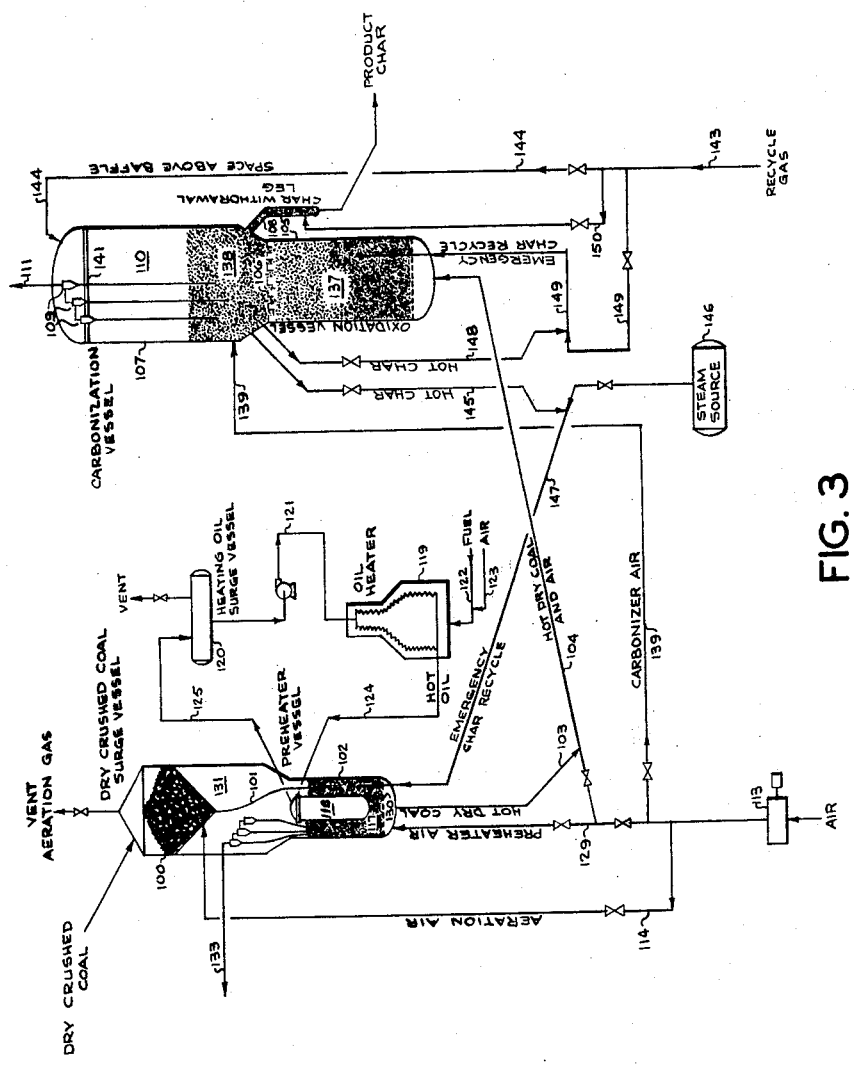
FIGURE 3 is a schematic flow diagram illustrating apparatus adapted for carrying out the preferred embodiment of the present invention, including a fluidized subplastic range preheating and preoxidation treatment, a plastic range fluidized preoxidation treatment and a superplastic range fluidized carbonization treatment.
Figure 4:
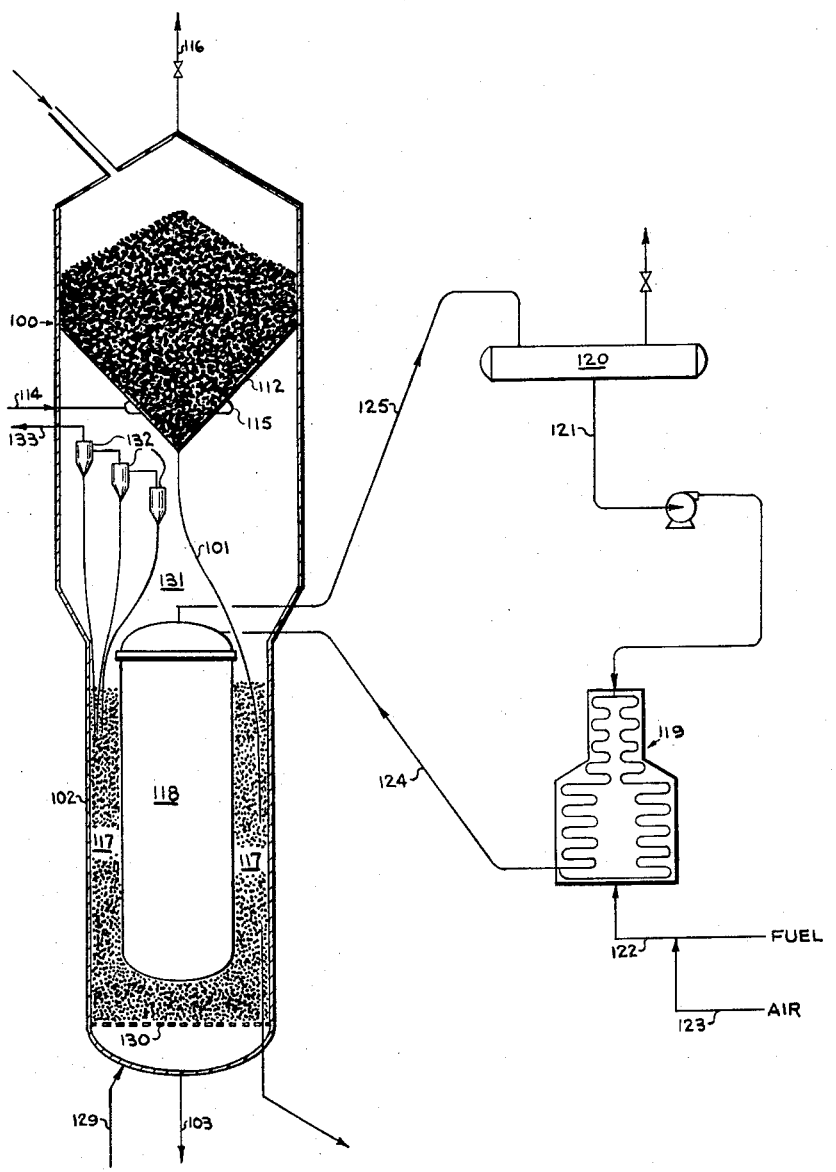
FIGURE 4 is a schematic illustration of apparatus adapted to carry out the sub-plastic range preheating and oxidation treatment under fluidized conditions.

FIGURE 3 presents a flow diagram for the preheating, oxidation and carbonization stages.

For orientation purposes, FIGURE 3 will be briefly described and the principal elements will be defined for reference by following the flow of coal through the flow sheets.

Caking coal in a crushed, dried condition is introduced into a coal surge vessel 100. The coal passes downwardly through a conduit 101 into a preheater vessel 102 which is integrally associated with the coal surge vessel 100. Preheated dried coal is withdrawn through a conduit 103 and transferred through a conduit 104 as a suspension in air into the bottom of an oxidation vessel 105. Oxidized coal and gases pass upwardly through a grid structure 106 into a carbonization vessel 107 which is integrally associated with the oxidation vessel 105. Devolatilized coal (termed "char") is withdrawn from the carbonization vessel 107 through a withdrawal leg 108 and recovered as product.

The tar vapors are evolved in the oxidation vessel 105 and the carbonization vessel 107 and are recovered, along with entrained solids, through a series of cyclone separators 109 mounted in a solids disengaging space 110 within the carbonization vessel 107. The tar vapors and associated non-condensible gases are transferred through a conduit 111 into a tar recovery system (not shown). The specific construction of the tar recovery system is unimportant in relation to the present invention. In general, we prefer to scrub the vapors in aqueous scrubbing apparatus to cool and condense valuable tar vapors and carbonization liquor. Any entrained solids also are precipitated along with the tar. Uncondensible gases comprise a combustible stream which may be recovered as a product gas or which may be employed as a recycle stream in the present process.

Having now described the principal elements and generally described the principal flow of materials through the process, a more detailed description of the process and inter-relation of its components will be presented.

The starting material in the present process is a caking bituminous coal which has been preliminarily crushed to pass through a 10 mesh Tyler Standard screen and preferably through a 14 mesh Tyler Standard screen. The coal contains 15 to 35 weight percent of particles which will pass through a 200 mesh Tyler Standard screen. By the term "caking coal" I include those bituminous coals which exhibit plastic properties between the temperatures of 715 to 800° F.

Dried crushed coal is introduced into the dried crushed coal surge vessel 100. The dried crushed coal vessel 100 and the preheater vessel 102 are integrally associated and are more clearly illustrated in FIGURE 4. The dried crushed coal surge vessel 100 comprises a chamber having a conical bottom wall 112, which also serves as the upper wall of the preheater vessel 102. The dried crushed coal surge vessel 100 is adapted to confine a bed of dried fluidizable size coal particles which can be withdrawn downwardly continuously through a feed conduit 101. A limited amount of aeration gas is introduced from an air supply source 113 through an aeration gas conduit 114 to maintain the coal within the coal surge vessel 100 under quiescent movement, such that its apparent density is about 30 pounds per cubic foot. The aeration gas is introduced through a series of nozzles 115 positioned near the apex of the conical bottom wall 112. Because of the very limited volume of aeration gases required, very little entrainment is experienced within the dried crushed coal surge vessel 100 and the aeration gases may be vented directly into the atmosphere through a conduit 116 in the top wall of the coal surge vessel 100.

The preheater vessel 102 is adapted to confine a fluidized bed 117 of coal particles at a preheating temperature of 300 to 550° F. Embedded within the fluidized bed 117 is a tube bundle 118 (more fully illustrated in FIGURE 5) through which a thermal transfer material is circulated to provide the bulk of the heat required to preheat the coal particles. Heat is provided for the thermal transfer material in a heating furnace 119. A suitable thermal transfer material, for example, is 15° API oil. Molten salts or molten metals might be employed as the thermal transfer material. A reservoir 120 for the oil is provided to smooth out the flow of oil through the coal heating system. Oil is withdrawn from the reservoir 120 through a conduit 121 and introduced into the heating section of the heating furnace 119. A fuel from conduit 122 (preferably liquid or gaseous) is burned with air from an air conduit 123 within the furnace 119 to heat the oil to a temperature not exceeding about 650° F. Heating of the oil to higher temperatures may result in a chemical breakdown of the oil. Also the agglomerative coal particles tend to adhere to heat transfer surfaces maintained above about 650° F. resulting in coke formation. The heated oil passes through a conduit 124 to the tube bundle 118. Within the tube bundle 118, heat is released from the oil to the coal particles within the fluidized bed 117. Cooled oil is recovered from the tube bundle 118 through a conduit 125 and returned to the reservoir 120 for recirculation.

Figure 5:
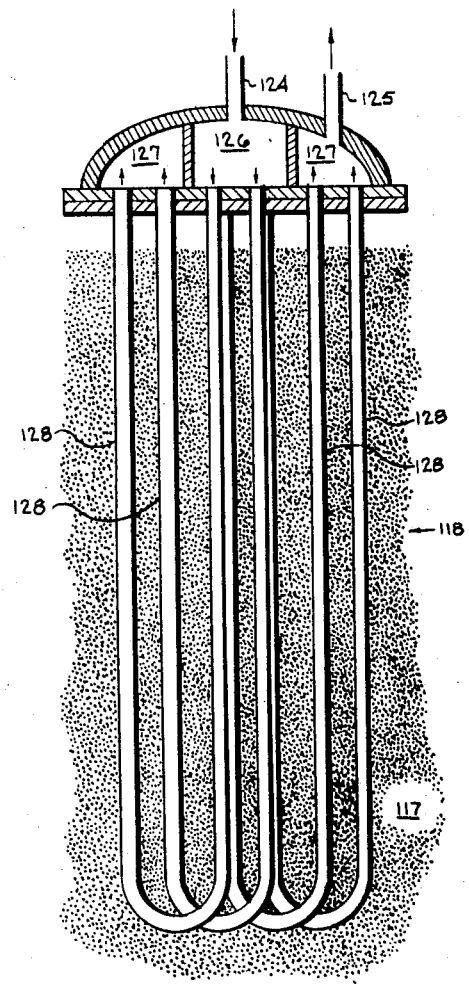
FIGURE 5 is a more detailed schematic illustration of heat exchange means shown in FIGURES 3 and 4.

In one embodiment, the tube bundle 118 may take the form as illustrated in FIGURE 5. Therein an oil header 126 is provided for receiving heated oil from the conduit 124 and two oil headers 127 are provided for receiving cooled oil for returning through the cooled oil conduit 125. Communicating between the heated oil header 126 and the cooled oil header 127 are a series of elongated U-shaped, heat-exchanger tubes 128. Each of the tubes 128 provides a flow path for heated oil from the heated oil header 126 through the fluidized bed 117 back to the cooled oil header 127. The superficial upper level of the fluidized bed 117 is maintained somewhat below the headers 126 and 127.

By virtue of the well-known turbulent characteristics of fluidized solids beds, the coal particles within the fluidized bed 117 obtain a virtually uniform temperature at which they can be recovered for further processing in the present process.

Coal particles which are introduced into the preheater vessel 102 through a conduit 101 establish therein a fluidized bed 117 of coal particles at a temperature of 300 to 550° F., preferably 350 to 500° F. The coal particles in the fluidized bed 117 are maintained in a dense phase fluidized condition by means of air introduced from an air supply source 113 through a conduit 129. The apparent bulk density of the preheater fluidized bed 117 is about 30 pounds per cubic foot. Air enters into the preheater vessel 102 beneath a horizontal grid 130 which supports the fluidized bed 117 of coal particles. If desired, the air may be preheated but should not be preheated above the temperature maintained within the preheater vessel 102. A pressure drop of about 1 p.s.i. is experienced by the air in passing through the horizontal grid 130. The horizontal grid 130 achieves a uniform distribution of fluidizing gases through the cross-sectional area of the fluidized bed 117. The air within the fluidized bed 117 serves as the fluidizing gas and maintains the coal particles therein in the turbulent random motion associated with dense phase fluidized solids contacting. A superficial linear velocity of about 0.5 to 2.0 feet per second is maintained within the fluidized bed 117.

In addition, the oxygen of the air is somewhat reactive toward the coal particles, particularly the coal fines, at the temperatures maintained within the preheater vessel 102. Accordingly, a limited amount of oxidation occurs on the surfaces of the coal particles. Since the coal fines have greater surface area-per-unit-weight, they achieve a greater oxidation-per-unit-weight than the relatively coarse coal particles within the fluidized bed 117. A limited amount of devolatilization of the coal particles occurs at the preheater temperatures resulting in evolution of coal vapors which pass upwardly through the fluidized bed 117 along with the fluidizing gases. At 500° F., about one gallon of volatile matter escapes from each ton of coal.

Fluidizing gases and coal vapors escape upwardly through the superficial upper level of the fluidized bed 117 and enter a solids disengaging zone 131 which has an enlarged cross-section and which serves to reduce the quantity of coal particles entrained in the escaping gases. A superficial linear velocity of about 0.2 to 1.0 foot per second is maintained within the disengaging zone 131. The gases containing some entrained solids enter a series of cyclone separators 132 mounted within the disengaging zone 131. The cyclone separators 132 serve to remove most of the entrained coal particles from the effluent gases which are discharged through a conduit 133. The coal particles separated in the cyclone separators 132 are returned to the fluidized bed 117 through diplegs 134 associated with each of the cyclone separators 132. Several banks of serially mounted cyclone separators 132 (one bank shown) may be mounted within the solids disengaging zone 131. The vapor discharge conduit from each bank of cyclone separators communicates with the conduit 133.

Preheated coal particles at a temperature of 300 to 550° F. are continuously withdrawn from the dense phase fluidized bed 117 through a conduit 103 whence they are entrained in a stream of air from the air supply source 113 through a transfer conduit 104 for transportation into the oxidation vessel 105. The coal particles thus introduced into the oxidation vessel 105 have been somewhat reduced in agglomerative tendencies by virtue of the slight oxidation which they have experienced in the preheater vessel 102. Some additional slight oxidation occurs during the transportation of the preheated coal particles as a dilute phase suspension in air through the transfer conduit 104.

Figure 6:
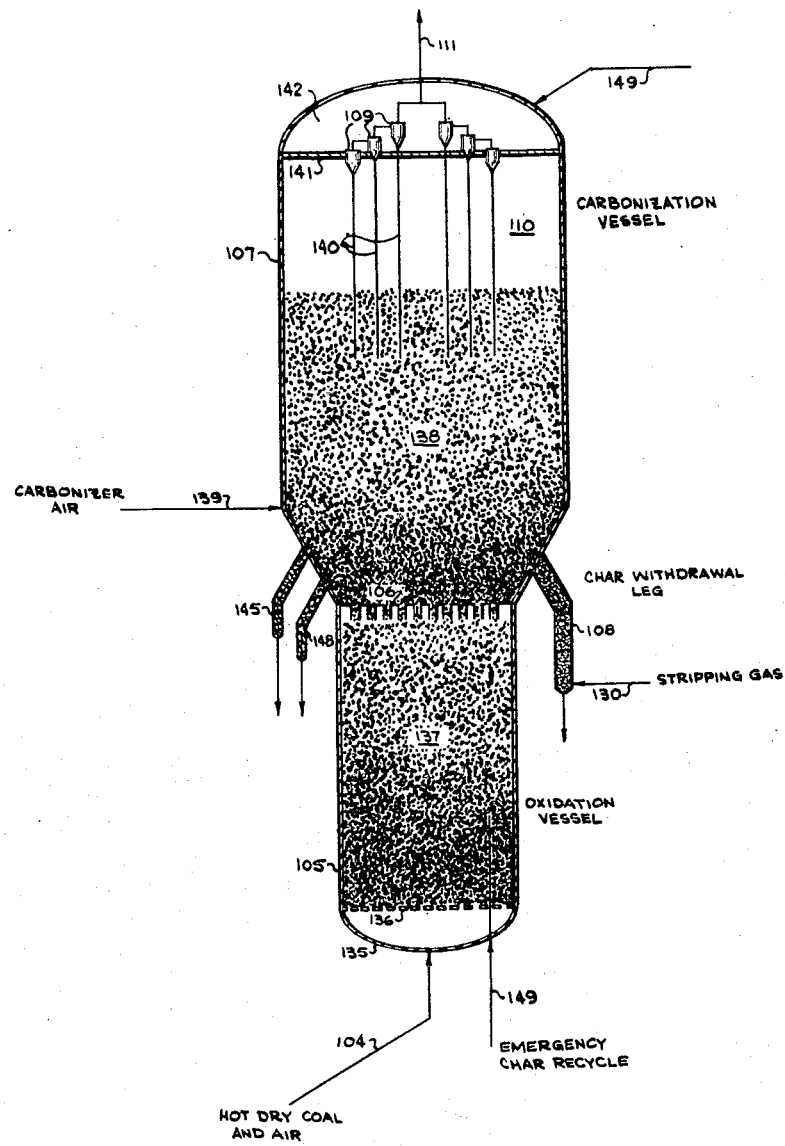
FIGURE 6 is a schematic illustration of a unitary vessel structure adapted to carry out the preferred embodiment of the present invention for the plastic range fluidized preoxidation treatment and the super-plastic range fluidized carbonization treatment.

The oxidation vessel 105 and the carbonization vessel 107 are integrally associated and are illustrated in greater detail in FIGURE 6.

The oxidation vessel 105 is a cylindrical vertical structure having a dome-shaped bottom 135 and a horizontal grid 136 extending over its entire cross-section near the bottom. At the upper end of the oxidation vessel 105, the cylindrical outer walls expand conically to join a vertical cylindrical vessel of larger cross-section which comprises the carbonization vessel 107. The carbonization vessel 107 and oxidation vessel 105 are in communication through a generally horizontal grid structure 106 positioned near the conical lower portion of the carbonization vessel 107.

For the horizontal grid structure 106 I prefer to use a structure similar to that disclosed in copending U.S. application S.N. 595,426 entitled "Improved Grid Structure for Fluidized Solids Contacting Apparatus," by Sam A. Jones and Schuyler T. B. Keating, filed July 2, 1956, now U.S. Patent No. 2,850,808. A grid structure of this type permits a certain "cushioning" effect within the oxidation vessel 105 and minimizes the tendency of the coal particles to plug the grid openings.

The dilute phase suspension of preheated coal particles and air introduced into the oxidation vessel 105 through the transfer conduit 104 passes upwardly through the lower grid structure 136 into an oxidation fluidized bed 137. A pressure drop of about 1 p.s.i. is maintained through the lower grid structure 136. The temperature maintained within the oxidation bed 137 is from 715 to 800° F., i.e., within the plastic temperature range of the coal undergoing treatment. The principal fluidizing gas within the oxidation fluidized bed 137 is the air which has been employed to introduce the coal particles. In passing upwardly through the oxidation fluidized bed 137, the air maintains the coal particles therein in the turbulent random motion associated with fluidized solids contacting. The superficial linear velocity of gases in the oxidation fluidized bed 137 is about 0.5 to 2.0 feet per second. The apparent bulk density of the oxidation fluidized bed 137 is about 20 to 30 pounds per cubic foot.

At the temperatures maintained within the oxidation vessel 105, a certain amount of coal devolatilization occurs and the resulting evolved gases and vapors pass upwardly along with the fluidizing gases. A substantial quantity of the oxygen contained in the fluidizing air reacts with coal particles within the oxidation fluidized bed 137 and serves to supply the heat necessary to maintain the desired oxidation temperature therein. Sufficient heat must be released to raise the temperature of the fluidizing gas itself and also of the associated incoming preheated coal particles. The presence of oxygen within the oxidation fluidized bed 137 also serves to prevent agglomerate formation within the oxidation fluidized bed 137. In addition, the oxidation occurring within the oxidation fluidized bed 137 serves to reduce the caking tendencies of the coal particles therein and thereby to permit their subsequent carbonization at a carbonization temperature within the carbonization vessel 107 without agglomerate formation.

The fluidizing gases and evolved coal vapors pass upwardly from the oxidation fluidized bed 137 through the grid structure 106 and convey oxidized coal particles along with them as a suspended phase into the carbonization vessel 107, forming therein, a fluidized carbonization bed 138. A pressure drop of about 1 p.s.i. is maintained across the grid structure 106.

The fluidized carbonization bed 138 is comprised of oxidized coal particles undergoing rapid devolatilization in admixture with already devolatilzed coal partcles termed "char" particles. A carbonization temperature is maintained within the fluidized carbonization bed 138, namely from 800 to 1400° F., preferably from 900 to 1100° F.

The additional heat required to maintain the carbonization temperature may be supplied in any convenient manner. Indirect heating may be employed. A portion of solid particles from the fluidized carbonization bed 138 may be withdrawn, subjected to partial combustion externally of the carbonization vessel 107 and reintroduced at a higher temperature into the carbonization bed 138. I prefer, however, to provide the heat for maintaining carbonization temperatures by partial combustion of coal and char particles within the carbonization bed 138 itself. This partial oxidation may be accomplished by at least two methods.

First, some additional oxygen (preferably as air from the air source 113) may be introduced through a carbonization air conduit 139 into the expanded diameter portion of the carbonization vessel 107. Any additional air thus introduced serves also as additional fluidizing gas within the fluidized carbonization bed 138. Such additional air reacts with coal and char to release heat. Also any oxygen which has not been consumed within the oxidation fluidized bed 137 passes through the grid structure 106 into the fluidized carbonization bed 138 where it reacts with coal and char to release heat.

Alternatively, the entire supply of air required for the oxidation and carbonization heat demands may be introduced into the oxidation vessel 105 through the conduit 104. Provided the oxygen utilization is not excessive within the fluidized oxidation bed 137, sufficient oxygen passes through the grid structure 106 into the fluidized carbonization bed 138 to provide the heat requirement for carbonization. Should oxygen utilization within the fluidized oxidation bed 137 prove excessive, the temperature therein increases above the desired value and equilibrates at a higher level. In general, I have found that the oxygen utilization achieved within the fluidized oxidation bed 138 is 60 to 90 percent, i.e., 60 to 90 percent of the oxygen introduced into the oxidation vessel 105 is consumed therein and the remaining 10 to 40 percent passes upwardly through the grid structure 106 into the fluidized carbonization bed 138. Oxygen utilization increases as the temperature within the oxidation vessel 105 is increased. Where a generally high temperature is desired in the carbonization bed 138, additional carbonization air may be required. For carbonization temperatures of 900 to 950° F., all of the air may be introduced directly into the oxidation vessel 105 as described in this second alternative.

The superficial linear velocity of gases through the fluidized carbonization bed 138 is maintained from about 0.5 to 2.0 feet per second. The apparent bulk density of the fluidized carbonization bed 138 is maintained at about 25 pounds per cubic foot.

Fluidizing gases, evolved tar vapors and entrained particles of coal and char escape upwardly through the superficial upper dense phase level of the fluidized carbonization bed 138 into a dilute phase solids disengaging zone 110 within the carbonization vessel 107. The effluent vapors and entrained solids enter the first of several banks of serially connected cyclone separators 109 mounted in the solids disengaging zone 110. The cyclone separators 109 serve to remove entrained particles from the effluent vapors and return the separated particles to the fluidized carbonization bed 138 through diplegs 140. The effluent vapors, partially freed of entrained solid particles, exit through a tar conduit 111 for recovery of the valuable liquid and gaseous products.

The quantity of tar varies from about 20 to 35 gallons per ton of coal feed. Significant quantities of finely divided solid particles consisting of coal and char are entrained in the vapors which pass through the tar conduit 111. In fact, the solids may represent from about 10 to 40 percent by weight of the recoverable moisture-free tar product. These coal and char particles can be separated from the product tar and may be returned to the carbonization system for their own ultimate recovery as product char. Techniques for accomplishing this recovery and reuse are beyond the scope of the present invention.

A horizontal baffle element 141 extends across the carbonization vessel 107 at its upper portion immediately above the vapor inlet passage of the first cyclone separator 109 in each bank. The baffle element 141 and the dome-shaped top wall of the carbonization vessel 107 define a recycle gas chamber 142 from which tar vapors and coal and char particles are excluded. The baffle element 141 serves as a barrier to prevent effluent vapors and entrained solids from rising above the inlet level of the first cyclone separator 109 in each bank. Succeeding cyclone separators 109 are positioned above the baffle element 141 within the recycle gas chamber 142. A positive gas pressure is maintained within the recycle gas chamber 142 to provide a net flow of purging gas, therefore into the solids disengaging zone 110. The net flow of purging gas provides assurance against entry of tar vapors or coal and char particles above the baffle element 141. To provide the positive gas pressure, a quantity of recycle gas is introduced into the recycle gas chamber 142 through a recycle gas conduit 143 and a conduit 144. The recycle gas thus introduced is representative of the gases already existing within the solids disengaging zone 110. Its continuing seepage into the solids disengaging zone 110, hence, does not deleteriously adulterate the carbonization vapors. The total quantity of recycle gas thus employed is less than 1 percent of the effluent gases leaving the carbonization vessel 107 through conduit 111. Provision of the baffle elements 141 and the associated positive gas pressure maintained in the recycle gas chamber 142 provides further assurance that coke formations will not result in the upper portion of the carbonization vessel 107. Without the baffle element 141, dense clouds of entrained solid particles and tar vapors could form within the vessel 107 above the vapor inlet to the first cyclone separator 109 in each bank since the turbulent conditions required to maintain the coal particles in motion would not exist thereabove.

Since the particles of oxidized coal and char comprising the fluidized carbonization bed 138 represent the hottest processing temperature in the present system, I have provided two means for employing these hot solid particles to correct emergency thermal upset conditions which may occur in other portions of the system. One such thermal upset which might occur would be a sudden temperature decrease within the fluidized bed 117 of the preheater vessel 102. Under equilibrium processing conditions, the temperature of preheated coal particles withdrawn from the preheater vessel 102 through the conduit 103 should be constant. In the event the temperature within the fluidized bed 119 decreases, hot char particles from the fluidized carbonization bed 138 may be recirculated as an emergency measure to supply the thermal deficiency in the fluidized bed 117.

To accomplish this result, a char withdrawal leg 145 is provided in the form of a downwardly extending tube in open communication with the fluidized carbonization bed 138. A normally closed valve is provided in this char withdrawal leg 145 to prevent solids flow therethrough under normal conditions. Under conditions of thermal upset in the fluidized bed 117 of the preheater vessel 102, the valve may be opened to cause hot char to flow downwardly through the char withdrawal leg 145. The hot char is entrained in a moving stream from a steam source 146 for transfer as a dilute phase suspension through an emergency char recycle conduit 147. The emergency char recycle conduit 147 extends upwardly into the preheater vessel 102 beyond the lower grid 130 for injecting hot char particles suspended in steam directly into the fluidized bed 117. By this means, any temperature decrease within the preheater vessel 102 may be quickly compensated and corrected by the recycle of only small quantities of char particles.

A second emergency condition which might occur within the system would result from sudden decrease in temperature within the oxidation vessel 105. Such sudden temperature decrease can be quickly corrected by recirculating a quantity of solid particles from the fluidized carbonization bed 138 directly into the fluidized oxidized bed 137. To accomplish this result, a char withdrawal leg 148 is provided extending downwardly from the carbonization vessel 107 in open communication from the fluidized carbonization bed 138. A valve is provided in the char withdrawal leg 148 for normally preventing flow of char therethrough. When, however, a sudden decrease occurs within the oxidation vessel 105, the valve may be opened to permit hot char from the fluidized carbonization bed 138 to flow through the oxidation char withdrawal leg 148. The hot char is entrained in a moving stream of recycle gas from recycle gas conduit 143 and an emergency char recycle conduit 149. The emergency char recycle conduit 149 enters the oxidation vessel 105 and extends upwardly beyond the lower grid 136 into the oxidation fluidized bed 137 for discharging a suspension of hot char directly into the fluidized oxidation bed 137. This emergency control mechanism provides a means for rapidly compensating and correcting sudden temperature decreases which may occur within the oxidation vessel 105.

The char product from the carbonization vessel 107 comprises about three-quarters of the coal feed. This product char, in the form of particulate solids, is withdrawn at the carbonization temperature continuously through a char withdrawal leg 108 comprising a downwardly extending tube associated with the carbonization vessel 107 in open communication with the fluidized carbonization bed 138. Desirably, a stream of recycle gas is introduced into the bottom of the char withdrawal leg 108 through a product char stripping gas conduit 150 which draws recycle gas from the recycle gas conduit 143. The stripping gas provides turbulence to prevent the char from plugging the char withdrawal leg 108 and also serves to strip any tar vapors which otherwise might fill the interstices between the individual char particles. Apparent bulk density of the material within the char withdrawal leg 108 is about 15 pounds per cubic foot. Hot char particles are withdrawn from the bottom of the char withdrawal leg 108 and recovered as a finely divided solid product. Usually it is desirable to recover the sensible heat of the product char for reuse in the process. Techniques for accomplishing this result are beyond the scope of the present invention.

Thus I have completed a general description of the preferred embodiment of my present invention as illustrated in FIGURES 3, 4, 5 and 6. For a specific illustration of this preferred embodiment, I have prepared the following tables showing specific operating conditions and results from a fluidized low temperature carbonization process for Moundsville coal. Moundsville coal is a typical caking bituminous coal obtained from the Pittsburgh seam in northern West Virginia. In Table I are listed the typical gross properties of Moundsville coal.

*Table I.—Moundsville Coal*

Proximate analysis:
Moisture _____ weight percent__ 1.5
Volatile matter _____ do____ 41.6
Fixed carbon _____ do____ 7.0
Ash _____ do____ 9.9
Gross heating value _____ B.t.u./lb__ 13,000

*Table II.—Processing Conditions and Results for Fluidized Carbonization of Moundsville Coal Basis: 600,000 Pounds of Coal per Hour (Moisture Free)*

Solid material flows:
  Coal feed to preheater vessel (200° F.)
  Preheated coal (450° F.)
  Char recovered from char withdrawal leg (925° F.)

| Gas flows | Solids content, grains per cu. ft. | Volume, million cu. ft. per hr. |
|---|---|---|
| Overhead gases from preheater | 11.1 | 0.553 |
| Air feed to preheater (95° F.) | | 0.47 |
| Air feed to fluidized oxidation vessel (95° F.) | | 1.74 |
| Additional air introduced into carbonization vessel (95° F.) | | 0.57 |
| Overhead vapors from carbonization vessel (925° F.) | 25.7 | 6.63 |
| Recycle gas as purge above baffle in carbonization vessel (340° F.) | | 0.0528 |
| Stripping gas for char withdrawal leg (steam) | | 0.0865 |

Size:
  Coal feed to preheater vessel—
    Through 14 mesh screen _____ percent__ 98
    Through 200 mesh screen _____ do____ 26.4
  Char recovered from product char vessel
                                percent volatile matter__ 15.6

Temperatures:
  Fluidized preheater vessel _____ ° F__ 450
  Fluidized oxidation vessel _____ ° F__ 725
  Fluidized carbonization vessel _____ ° F__ 925

Liquid flows: Circulating oil to indirect heat transfer tube bundle of fluidized preheater, inlet temperature 550–650° F., outlet temperature 450–500° F. _____ 59,200

| Gas velocities and bed densities | Velocity, feet per second | Density, pounds per cu. ft. |
|---|---|---|
| Fluidized preheater | 0.7 | 30 |
| Fluidized oxidation vessel | 0.7–1.3 | 22 |
| Fluidized carbonization vessel | 0.7–1.9 | 15 |
| Through grid between oxidation vessel and carbonization vessel | 100–200 | |

Miscellaneous:
  Condensible tar vapors recovered in overhead gases from
    carbonization vessel (lbs. per hour) _____ 72,500
  Oxygen utilization in fluidized oxidation vessel__percent__ 70

Average residence time of solids:
  Fluidized preheater _____ minutes__ 10.8
  Fluidized oxidation vessel _____ do____ 31.3
  Fluidized carbonization vessel _____ do____ 30.9

In an alternate embodiment of the present invention I provide additional oxidation capacity for the process by including an independent oxidation vessel between the fluidized coal preheating stage and the fluidized oxidation stage. As described, oxidation occurs only at a limited rate at the temperature of 300 to 350° F. specified for the fluidized preheater stage. The indirect heating of the preheater vessel operates efficiently when the preheater bed temperature is maintained in the lower portion of the specified temperature range of 300 to 550° F. At lower temperatures, e.g., 300 to 450° F., for example, a greater temperature differential can be maintained between the indirect heater and the coal particles whereby a greater heat transfer efficiency is realized. At these lower preheater temperatures, the oxidation rate is low. Hence it may be desirable to separate the indirect preheating from the preliminary oxidation, i.e., provide indirect preheat independently of oxidation to achieve maximum heat transfer efficiency for the indirect preheating and thereafter provide preliminary oxidation independently to gain advantages of the greater oxidation rate attainable at the more elevated temperatures. Accordingly, I provide increased oxidation capacity in an additive independent oxidation vessel for oxidizing preheated coal at temperatures of 400 to 550° F. when reaction occurs at a yet limited but significantly increased rate.

The additional oxidation vessel will be described in relation to FIGURES 7 and 8.

Figure 7:
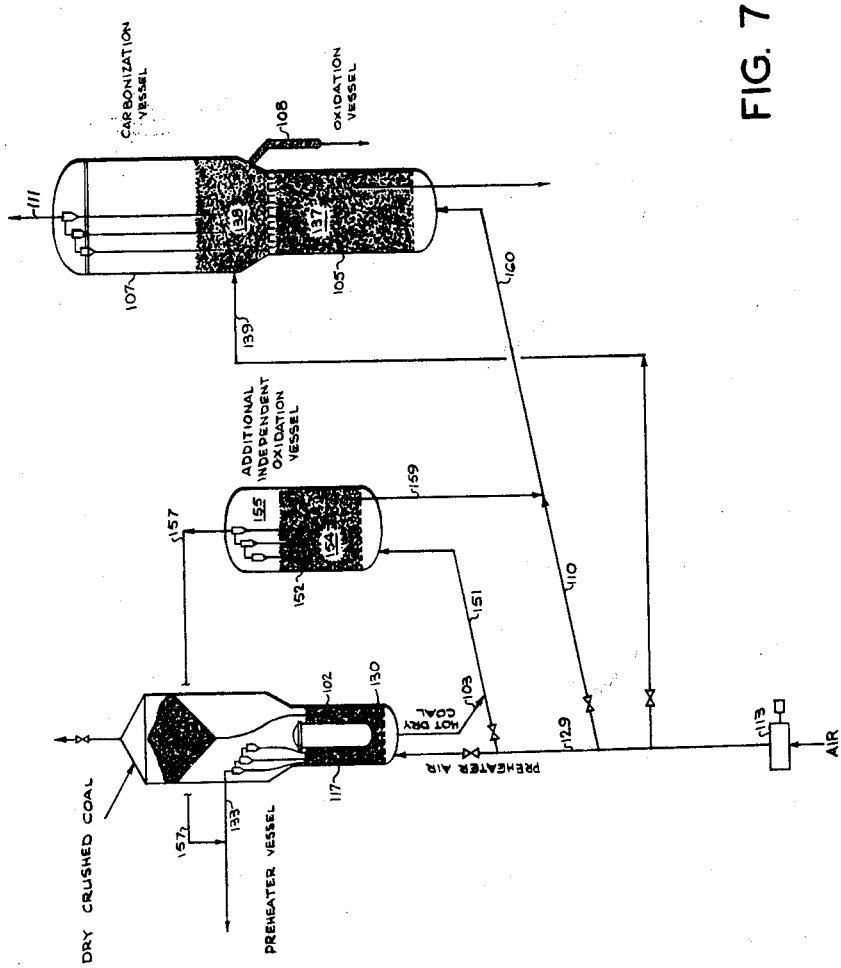
FIGURE 7 is a fragmentary schematic illustration of an alternative embodiment of the preferred embodiment including an additional oxidation vessel for sub-plastic oxidation treatment.
Figure 8:
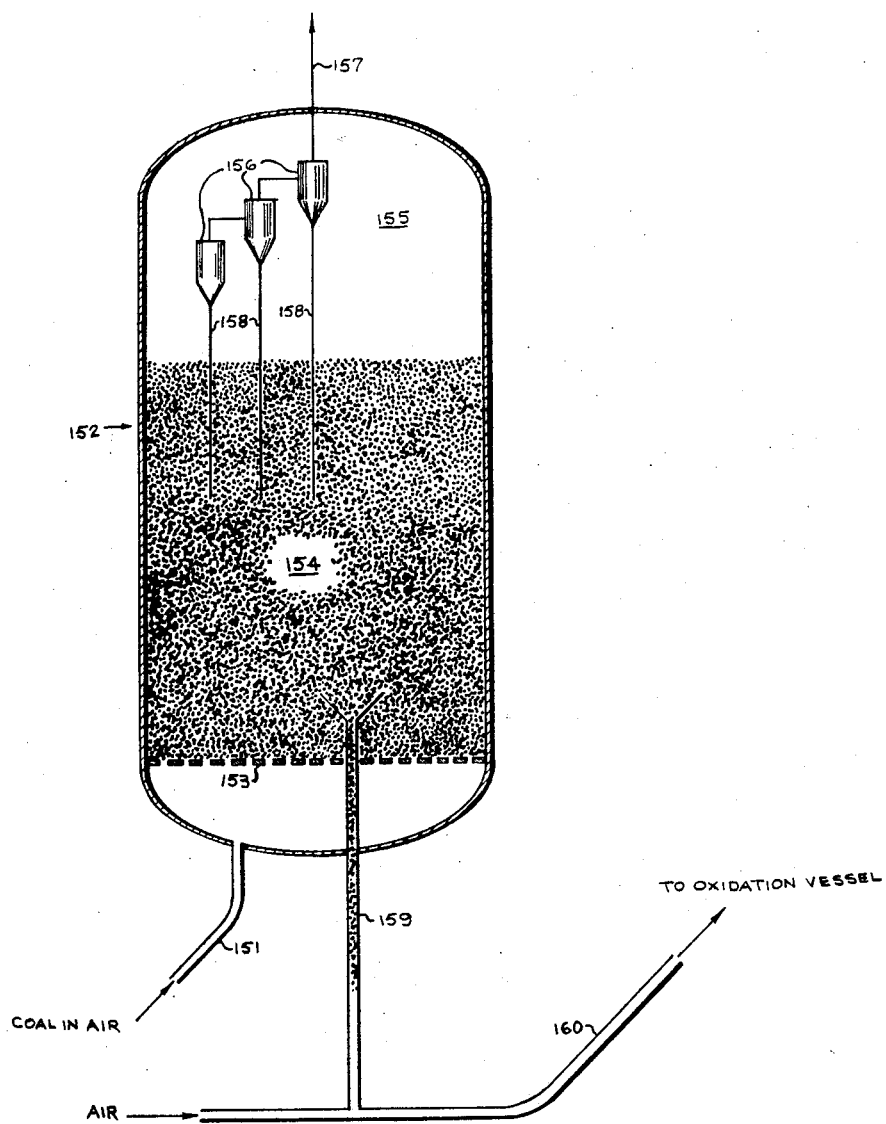
FIGURE 8 is a more detailed schematic illustration showing the additional oxidation vessel of FIGURE 7.

In FIGURE 7 I have illustrated a fragmentary portion of the flow diagram fully presented in FIGURE 3 and have modified the fragmentary portion by including an additional independent oxidation vessel. Elements of FIGURE 7 corresponding to elements of FIGURE 3 have common reference numerals. As shown in FIGURE 7, the preheater vessel 102 and the oxidation vessel 105 are as described in connection with FIGURE 3. Preheated coal is withdrawn from the fluidized bed 117 through conduit 103 and is entrained in a stream of air from air source 113 through a conduit 151. The suspension of air and preheated coal particles is blown into an additional independent oxidation vessel 152 which is more clearly illustrated in FIGURE 8. The additional independent oxidation vessel 152 is a vertical cylindrical vessel with dome-shaped ends. A horizontal grid 153 extends across the additional independent oxidation vessel 152 near its bottom end. Sufficient openings are provided in the grid 153 to permit coal and air to pass therethrough and to be uniformly distributed thereabove. A linear velocity of perhaps 100 feet per second is maintained for the air and coal passing through the grid openings. A pressure drop of about 1 p.s.i. is maintained across the grid 153. A fluidized bed 154 of coal particles is maintained above the grid 153 under the influence of upwardly rising air. The fluidized bed preferably is maintained at a temperature of about 400 to 550° F. A combustion reaction consumes some of the oxygen from the fluidizing gases to provide the heat required to maintain the desired temperature. The combustion reaction must release sufficient heat to raise the temperatures of incoming air and coal to the desired temperature and also to offset heat losses. An apparent bulk density of about 25 pounds per cubic foot is maintained in the fluidized bed 154.

Fluidizing gases ultimately break through the superficial upper level of the fluidized bed 154 and enter a solids disengaging space 155. The gases in the solids disengaging space 155 comprise air, patially depleted of oxygen and gaseous product of combustion along with some evolved coal vapors. Substantial quantities of coal particles which would be entrained in these gases are recovered as the gases pass through a series of cyclone separators 156, prior to leaving the additional independent oxidation vessel 152 through a conduit 157. The recovered coal particles are returned to the fluidized bed 154 through diplegs 158. The effluent gases which pass through conduit 157 are combined with the preheater vessel effluent gases in conduit 133 for common disposal.

Oxidized coal particles are received from the fluidized bed 154 through a conduit 159, and entrained in a stream of air from an air source 113 through conduit 160, and are transported in suspension into the oxidation vessel 105. The air introduced through conduit 160 now serves as the fluidizing and oxidizing gas for the oxidation vessel 105 as previously described.

Recovery of oxidized coal particles from an internal point within the fluidized bed 154 provides positive assurance against inadequate oxidation of coal fines. The coal fines will be selectively stripped from the fluidized bed 154 by virtue of their smaller size, yet the entrained fines are continuously returned to the fluidized bed 154 through the diplegs 158. The coal fines which advance forwardly through the process are recovered from the additional independent oxidation vessel 152 solely from an internal portion in the fluidized bed 154. Thus, the coal fines cannot experience an abbreviated exposure to oxidizing conditions which might be insufficient to achieve the desired diminution of their agglomerative tendencies.

As a further alternative, the additional oxidation treatment carried out in the fluidized bed 154 may be conducted at slightly higher sub-plastic temperatures, e.g. above 550° F. but below the incipiently agglomerative temperature. If such treatment is desired, the overhead vapors of conduit 157 preferably are recovered to avoid loss of their valuable devolatilization products. Conveniently this recovery can be accomplished by connecting the conduit 157 with the tar recovery conduit 111 rather than with the preheater vapor conduit 133 (as shown).

VII. ILLUSTRATION

For a more complete illustration of the present invention, Moundsville coal, a typical caking bituminous coal from the Pittsburgh seam, was treated in apparatus corresponding to that illustrated in FIGURE 1. The extrinsic heat for the fluidized coal preheating vessel was supplied by electrical heating elements wound about its side walls. Both the gases and solids leaving the fluidized coal preheating vessel were introduced into the fluidized preoxidizer vessel.

The apparatus was operated under four different sets of conditions within a 30-hour period. At each set of conditions, equilibrium was established and samples of coal were recovered for analysis as follows:

(1) Effluent solids from the fluidized coal preheater vessel
(2) Bed solids from the fluidized preoxidizer vessel
(3) Effluent solids from the fluidized preoxidizer vessel The four sets of conditions are labelled A, B, C and D in the following Table III.

*Table III*

| Run | A | B | C | D |
|---|---|---|---|---|
| Time | 5 a.m. | 5 p.m. | 11 p.m. | 10 a.m. |
| Fluidized Preheater Vessel: | | | | |
| Coal feed, lbs./hr | 800 | 1,500 | 1,900 | 2,200 |
| Gas feed, s.c.f.h.— | | | | |
| Air | 0 | 1,855 | 4,020 | 4,025 |
| Recycle gas | 9,300 | 2,255 | 315 | 340 |
| Bed Temperature, °F | 425 | 455 | 430 | 430 |
| Solids residence time, min | 93 | 54 | 42 | 37 |
| Fluidized Preoxidation Vessel: | | | | |
| Gas feed (In addition to effluent from fluidized preheater) s.c.f.h.— | | | | |
| Air | 4,000 | 3,960 | 4,030 | 3,950 |
| Bed Temperature, °F | 720 | 718 | 719 | 717 |
| Solids residence time, min | 128 | 81 | 64 | 55 |
| Fluidized Carbonization Vessel: | | | | |
| Gas feed (In addition to effluent from fluidized preoxidizer) s.c.f.h.— | | | | |
| Air | 875 | 1,230 | 925 | 2,095 |
| Recycle gas | 1,100 | 950 | 1,100 | 0 |
| Bed Temperature, °F | 900 | 900 | 905 | 927 |
| Solids residence time, min | 127 | 69 | 56 | 47 |
| Total oxidation in preheater and preoxidizer vessels, wt. percent of starting coal | 5.7 | 4.4 | 5.3 | 4.7 |
| Caking Indices (Retained on 28-mesh screen): | | | | |
| (1) Preheating vessel effluent | 86 | 85.5 | 89 | 88 |
| (2) Preoxidizer bed solids | 71 | 63 | 61 | 64 |
| (3) Preoxidizer effluent | 56 | 24 | 1.5 | 1.5 |

The coal samples withdrawn from each run were subjected to a caking index test especially developed to provide a criterion of operability for coal particles undergoing fluidized carbonization and pretreatment. Briefly, the caking index test involves heating a screened fraction of each sample in a crucible at 925° F. for one hour in a nitrogen gas stream. The contents of the crucible, thereafter are cooled and tumbled for 500 rotations in a metal cylinder. The percentage of a size fraction (the material retained on a designated screen) found following the analysis less the percentage of that size fraction originally present in the coal sample is the quantitative caking index. Such a caking index, while arbitrary, presents reproducible values which are of interest in comparing relative agglomerative tendencies of the coal under actual carbonization conditions. The index measures the quantity of large nonfriable agglomerates actually found when the coal is exposed to elevated carbonization temperatures.

Figure 9:
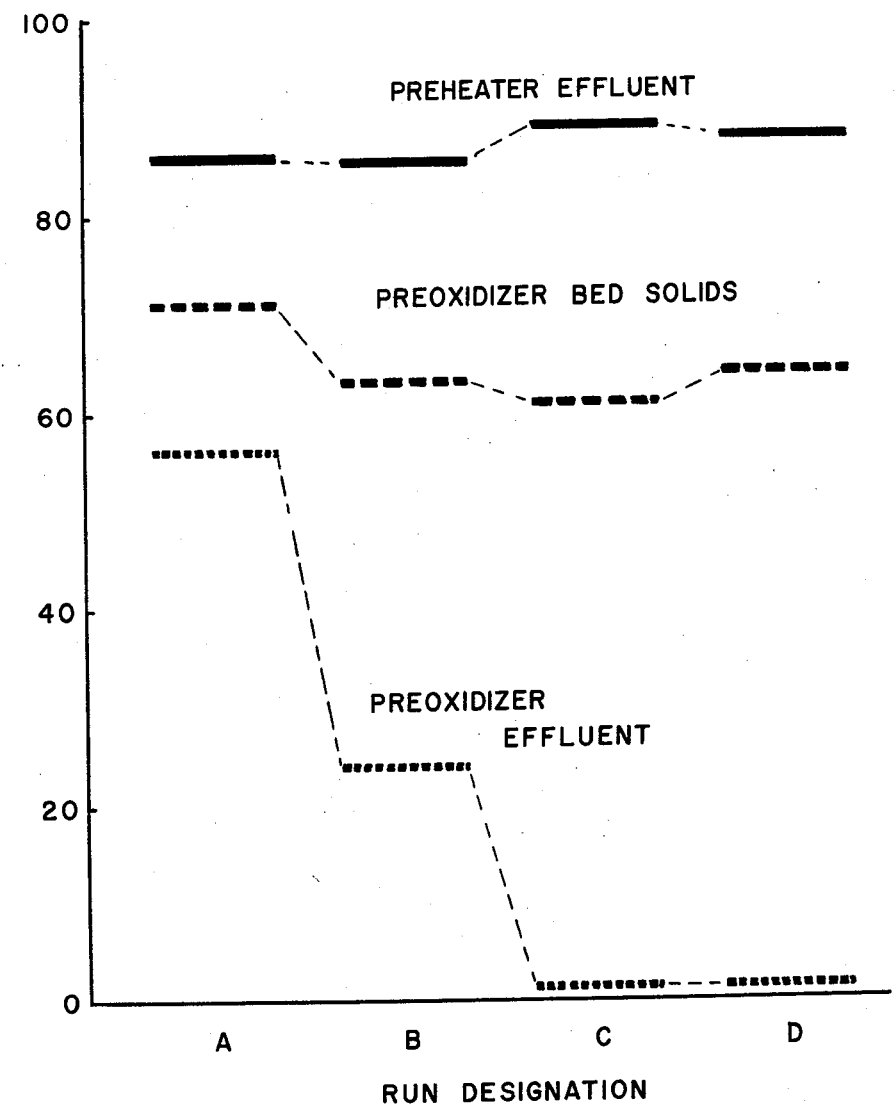
FIGURE 9 is a graphical representation of caking index data for samples of caking coal undergoing treatment according to FIGURE 1.

The caking indices for a 28 mesh designated screen size are presented graphically in FIGURE 9 for the three samples obtained in each of the four runs.

In run A, only recycle gas was used in the fluidized preheater vessel. Total oxidation in the preoxidizer vessel was 5.7 percent for a coal feed rate of 900 pounds per hour. No oxidation occurred in the preheater vessel.

In run B, the gas in the fluidizer preheater vessel was nearly half-and-half air and recycle gas. Total oxidation in the preheater and preoxidizer vessels was 4.4 percent for a coal feed rate of 1500 pounds per hour.

In runs C and D, the fluidized preheater vessel received virtually exclusively air. Total oxidation in the preheater and preoxidizer vessels in run C was 5.3 percent for a coal feed rate of 1900 pounds per hour; in run D it was 4.7 percent for a coal feed rate of 2200 pounds per hour.

Note that the caking index of the coal in all four runs was about the same for those samples of effluent solids from the fluidized preheater vessel. Note also that the caking index of the coal in all four runs was about the same for those samples of bed solids from the fluidized preoxidizer vessel. However, the caking index of those samples of fluidized preoxidizer effluent coal varied according to whether the coal had been exposed to oxidation in the preceding fluidized preheater vessel. Since the effluent solids from the fluidized preoxidizer vessel in my present process are next treated under fluidized carbonization conditions, the agglomerative tendencies of these samples is significant.

In run A no oxidation was effected during preheating. The effluent solids from the subsequent preoxidizer had a caking index of 56. In run B, extremely mild oxidation occurred during preheating. The effluent solids from the subsequent preoxidizer had a caking index of 24. In runs C and D the preheating fluidizing gases were air, except for a minor quantity of recycle gas employed as a purge gas. The caking index of the effluent solids from the subsequent preoxidizer was about 1.5 for run C and for run D.

Thus, by providing oxidation for the coal during the preheating treatment as well as the preoxidation treatment, less total oxidation was required and greater coal throughput was achieved. The treated coal exhibited less agglomerating tendencies as evidenced by the caking index. The improvement is not evident in the preheater effluent or in the solids undergoing the preoxidation treatment but is manifested in the resulting pretreated coal.

The reason for this phenomenon is probably related to the fact that the coal fines are principally affected during the subplastic oxidation whereas the generally coarser coal is principally affected during the plastic-range oxidation.

In run A, for example, the coal fines are not oxidized in the preheating zone and are only slighted oxidized in the preoxidizing treatment and hence continue to contribute their agglomerative tendencies to the total coal stream.

In runs C and D, the coal fines are adequately oxidized during the preheating treatment and the coarser particles are adequately oxidized during the preoxidation treatment. In run B, the coal fines are only slightly oxidized during the preheating treatment and the coarser particles achieve oxidation during the preoxidation treatment.

It should be emphasized that operability for the entire system (including the succeeding fluidized carbonization treatment) resulted in each of runs A, B, C and D. Note, however, that the coal throughput for runs C and D was more than twice that for run A.

When the present invention is practiced, oxidation is conducted at two levels, i.e., at a sub-plastic temperature and at a plastic temperature. In each of its embodiments, a minor portion of the total pretreatment oxidation occurs in the sub-plastic temperature range and the major portion occurs in the plastic temperature range. This distribution of oxidation between the two pretreatments is applicable to all caking bituminous coals even though the total quantity of oxidation required to achieve operability will vary widely depending upon the caking tendencies of the individual coal being processed.

The present application is a continuation-in-part of my copending application Serial Number 427,588, filed May 4, 1954, and assigned to the assignee of the present application.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:

1. The method of carbonizing a finely divided caking bituminous coal which comprises preheating the coal to an elevated temperature below the plastic range of the coal in a fluidized state, contacting the coal with oxygen at a temperature below the plastic range of the coal, passing the coal into a preoxidation zone, maintaining the coal in a fluidized state by means of an oxygen-containing gas therein at a temperature within the plastic range of the coal, passing the coal and gases from said preoxidation zone upwardly without deliberate separation into a carbonization zone, maintaining the coal in a fluidized state therein at a temperature above the plastic range of the coal and separately recovering from said carbonization zone coal evolution vapors and solid particulate carbonization residue.

2. The method of carbonizing a finely divided caking bituminous coal having plastic properties in the temperature range from 715 to 800° F. which comprises preheating the coal in a fluidized state by indirect heat transfer to an elevated temperature below the plastic range of the coal and between 300 and 550° F., contacting the coal with oxygen-containing gas in a confined bed under fluidized conditions at a temperature below the plastic range of the coal, recovering coal from the dense phase portion of said confined bed, passing said coal into a preoxidation zone, maintaining the coal in a fluidized state by means of an oxygen-containing gas therein at a temperature within the plastic range of the coal and between 715 and 800° F., passing the coal and gases from said preoxidation zone upwardly without deliberate separation into a carbonization zone, maintaining the coal in a fluidized state therein at a temperature above the plastic range of the coal and between 800 and 1400° F., and separately recovering from said carbonization zone coal evolution vapors and solid particulate carbonization residue.

3. The method of carbonizing a caking bituminous coal having plastic properties in the temperature range from 715 to 800° F. which comprises preparing substantially moisture-free coal capable of passing through a 10 mesh Tyler Standard screen and containing 15 to 35 percent by weight of particles capable of passing through a 200 mesh Tyler Standard screen, preheating said coal in a fluidized state by indirect heat transfer to an elevated temperature below the plastic range of the coal and between 300 and 550° F., contacting the coal with oxygen-containing gas in a confined bed under fluidized conditions at a temperature below the plastic range of the coal and between 300 and 550° F., to achieve a partial oxidation of the coal whereby the coal particles capable of passing through a 200 mesh Tyler Standard screen achieve a greater oxidation-per-unit-weight than the coal particles which are retained on a 200 mesh Tyler Standard screen, recovering coal from the dense phase of said confined bed, passing thus treated coal into a preoxidation zone, maintaining the coal in a fluidized state by means of an oxygen-containing gas therein at a temperature within the plastic range of the coal and between 715 and 800° F., passing the coal and gases from said preoxidation zone upwardly without deliberate separation into a carbonization zone, maintaining the coal in a fluidized state therein at a temperature above the plastic range of the coal and between 800 and 1400° F. and separately recovering from said carbonization zone coal evolution vapors and solid particulate carbonization residue.

4. The method of carbonizing a caking bituminous coal having plastic properties in the temperature range from 715 to 800° F. which comprises preheating the coal to an elevated temperature below the plastic range of the coal and between 300 and 550° F. in an air-fluidized preheater zone, supplying a major portion of the heat to said preheating zone indirectly and a minor portion by partial oxidation of coal therein with air, thereafter passing the coal through a preoxidation zone, maintaining the coal while in said preoxidation zone in a fluidized state and at a temperature within the plastic range of the coal and between 715 and 800° F., oxidizing the coal in said preoxidation zone, thereafter passing the preoxidized coal through a distillation zone, maintaining the preoxidized coal while in said distillation zone in a fluidized state and at a temperature above the plastic range of the coal and between 800 and 1400° F., distilling the preoxidized coal in said distillation zone, and recovering from said carbonization zone the products of distillation.

5. The method of carbonizing a finely divided caking bituminous coal having plastic properties in the temperature range from 715 to 800° F. which comprises passing the coal successively through a preheating zone, a preoxidation zone and a distillation zone, the temperature of the preheating zone being below the plastic range of the coal, the temperature of the preoxidation zone being within the plastic range of the coal and between 715 and 800° F. and the temperature of the distillation zone being above the plastic range of the coal and between 800 and 1400° F., contacting the coal in a fluidized state in the preheating zone with oxygen to supply a minor portion of the preheat and supplying indirect heat to said preheating zone to provide a major portion of the preheat, contacting the coal in a fluidized state in the preoxidation zone with oxygen, thereby to render it substantially non-agglomerative in both the preoxidation zone and the distillation zone, partially distilling the fluidized coal in the preoxidation zone, completing the distillation under fluidizing conditions in the distillation zone, and recovering the products of distillation.

6. The method of carbonizing a finely divided bituminous coal having plastic properties in the temperature range from 715 to 800° F. which comprises passing said coal successively through a preheating zone, a preoxidation zone and a distillation zone, heating the coal in the preheating zone to an elevated temperature below the plastic range of the coal, maintaining the coal in the preheating, preoxidation and distillation zones in a fluidized state, heating the coal in a fluidized state in the preheating zone by indirect heat transfer to a temperature of 300 to 550° F., contacting the coal with air under fluidizing conditions at a temperature of 300 to 550° F. to effect partial oxidation of the coal, contacting air with the coal in the preoxidation zone at a temperature within the plastic range of the coal and between 715 and 800° F., thereby to render the coal substantially non-agglomerative in both the preoxidation zone and the distillation zone, supplying sufficient additional heat to the distillation zone to maintain its temperature above the plastic range of the coal and between 800 and 1400° F., partially distilling the coal in the preoxidation zone for a time sufficient to yield more than 20 but less than 50 percent by weight of the total tar recovered, completing the distillation in the distillation zone, and recovering from said distillation zone the products of distillation.

7. The method of carbonizing a finely divided caking bituminous coal having plastic properties in the temperature range from 715 to 800° F. which comprises heating the coal to an elevated temperature below the plastic range of the coal and between 300 and 550° F. in a preheating zone wherein the coal is maintained in a dense phase fluidized condition in reactive relation to an oxygen-containing gas, passing preheated coal through a preoxidation zone, maintaining the coal while in said preoxidation zone for about 10 to 40 minutes in a dense phase fluidized state and at a temperature within the plastic range of the coal and between 715 and 800° F., passing an oxygen-containing gas through said preoxidation zone to oxidize a portion of the coal therein, thereafter passing the preoxidized coal and gases from said preoxidation zone without intentional cooling to a distillation zone, maintaining the preoxidized coal while in said distillation zone in a dense phase fluidized state and at a temperature above the plastic range of the coal and between 800 and 1400° F., distilling the preoxidized coal in said distillation zone, and recovering the products of distillation.

8. The method of carbonizing a finely divided bituminous coal having plastic properties in the temperature range from 715 to 800° F. which comprises heating said coal to an elevated temperature below the plastic range of the coal and between 300 and 550° F. in a preheating zone wherein the coal is maintained under fluidized conditions, introducing the bulk of the heat required by circulating a confined stream of heated liquid through said preheating zone, contacting the coal while at a temperature between 300 and 550° F. with oxygen under fluidized conditions in a dense phase fluidized bed whereby the agglomerative properties of the coal are reduced but not sufficiently reduced to prevent the coal from forming agglomerates if heated directly to a temperature above the plastic range of the coal and above 800° F., thereafter recovering coal from said dense phase fluidized bed and contacting the coal with air under fluidized conditions in a preoxidation zone at a temperature within the plastic range of the coal and between 715 and 800° F. thereby to render the coal substantially non-agglomerative if heated directly to a temperature above the plastic range of the coal and above 800° F., partially distilling the coal in said preoxidation zone to evolve tar vapors, passing all of the contents of said preoxidation zone upwardly into a distillation zone, maintaining the coal in said distillation zone in a fluidized condition at a temperature above the plastic range of the coal and between 800 and 1400° F., completing the distillation of the coal in said distillation zone and recovering the products of distillation therefrom.

9. The method of carbonizing a caking bituminous coal having plastic properties in the temperature range from 715 to 800° F. and having a nominal top size from 4 mesh to 35 mesh Tyler Standard screen and including from 15 to 35 percent of particles capable of passing through a 200 mesh Tyler Standard screen, which comprises preheating said coal to a temperature below the plastic range of the coal and between 300 and 550° F. while the coal is maintained under fluidized conditions in a dense phase fluidized bed, supplying a minor portion of the heat required by oxidation of the coal and a major portion by indirect heat transfer, recovering relatively fine particles and relatively coarse particles of coal from said dense phase fluidized bed, said relatively fine particles having a greater oxidation-per-unit-weight than said relatively coarse particles, passing thus treated coal particles into the preoxidation zone, maintaining said coal particles in a fluidized state in said preoxidation zone with air within the plastic range of the coal and between 715 and 800° F. thereby to render the coal non-agglomerative, passing all of the contents of said preoxidation zone upwardly without deliberate separation into a distillation zone, maintaining the coal in a fluidized condition in said distillation zone at a temperature above the plastic range of the coal and between 800 and 1400° F., completing the distillation of the coal in said distillation zone and separately recovering the solid and vaporous products of distillation.

10. The method of carbonizing a finely divided caking bituminous coal having plastic properties in the temperature range from 715 to 800° F. which comprises preheating the coal in a fluidized state by indirect heat transfer to an elevated temperature below the plastic range of the coal and between 300 and 550° F., contacting the coal with oxygen-containing gas in a confined bed under fluidized conditions at a temperature below the plastic range of the coal to achieve thereby a minor portion of pretreatment oxidation of the coal, recovering coal from the dense phase portion of said confined bed, passing said coal into a preoxidation zone, maintaining the coal in a fluidized state by means of an oxygen-containing gas therein at a temperature within the plastic range of the coal and between 715 and 800° F. to achieve thereby a major portion of pretreatment oxidation of the coal, passing the coal and gases from said preoxidation zone upwardly without deliberate separation into a carbonization zone, maintaining the coal in a fluidized state therein at a temperature above the plastic range of the coal and between 800 and 1400° F., and separately recovering from said carbonization zone coal evolution vapors and solid particulate carbonization residue.

11. The method of carbonizing a finely divided caking bituminous coal having plastic properties in the temperature range from 715 to 800° F. which comprises heating the coal to an elevated temperature below the plastic range of the coal and between 300 and 550° F. in a preheating zone where the coal is maintained in a dense phase fluidized condition, introducing preheated coal into a subplastic range oxidation zone, maintaining the coal therein in a dense phase fluidized state in relation to an oxygen-containing gas at a temperature below the plastic range of the coal to achieve therein a minor portion of pretreatment oxidation of the coal, passing the coal from the dense phase portion of the bed of said subplastic range oxidation zone through a plastic range oxidation zone, maintaining the coal therein in a dense phase fluidized state at a temperature within the plastic range of the coal and between 715 and 800° F., passing an oxygen-containing gas through said plastic range oxidation zone to achieve therein a major portion of pretreatment oxidation in the coal, thereafter passing the preoxidized coal and gases from said plastic range oxidation zone without intentional cooling to a distillation zone, maintaining the preoxidized coal while in said distillation zone in a dense phase fluidized state and at a temperature above the plastic range of the coal and between 800 and 1400° F., distilling the preoxidized coal in said distillation zone, and recovering the products of distillation.

References Cited in the file of this patent

UNITED STATES PATENTS

| | | |
|---|---|---|
| 2,131,702 | Berry | Sept. 27, 1938 |
| 2,276,362 | Wolf | Mar. 17, 1942 |
| 2,512,076 | Singh | June 20, 1950 |
| 2,534,728 | Nelson et al. | Dec. 19, 1950 |
| 2,560,357 | Martin | July 10, 1951 |
| 2,560,478 | Roetheli | July 10, 1951 |
| 2,582,712 | Howard | Jan. 15, 1952 |
| 2,595,366 | Odell | May 6, 1952 |
| 2,658,862 | Horner | Nov. 10, 1953 |
| 2,677,650 | Welinsky | May 4, 1954 |
| 2,775,551 | Nathan et al. | Dec. 25, 1956 |
| 2,805,189 | Williams | Sept. 3, 1957 |
| 2,844,526 | Nathan et al. | July 22, 1958 |

FOREIGN PATENTS

| | | |
|---|---|---|
| 757,083 | Great Britain | Sept. 12, 1956 |

OTHER REFERENCES

Chem. Eng., 59, 244 (March 1952) (3 pages).

UNITED STATES PATENT OFFICE
CERTIFICATE OF CORRECTION

Patent No. 3,070,515                      December 25, 1962

Nels E. Sylvander

It is hereby certified that error appears in the above numbered patent requiring correction and that the said Letters Patent should read as corrected below.

Column 8, line 17, for "coil" read -- coal --; column 18, Table II, second section, line 13 thereof, for "450-500° F." read -- 450-550° F. --; column 19, line 52, for "patially" read -- partially --; column 20, Table III, second column, line 1 thereof, for "800" read -- 900 --; same Table III, second column, line 3 thereof, for "9,300" read -- 2,300 --; column 21, line 20, for "fluidizer" read -- fluidized --; column 26, line 4, after "in", second occurrence, insert -- reactive --.

Signed and sealed this 18th day of June 1963.

(SEAL)
Attest:

ERNEST W. SWIDER                      DAVID L. LADD
Attesting Officer                      Commissioner of Patents